US008842082B2

(12) United States Patent  
Migos et al.

(10) Patent No.: US 8,842,082 B2
(45) Date of Patent: Sep. 23, 2014

(54) DEVICE, METHOD, AND GRAPHICAL USER INTERFACE FOR NAVIGATING AND ANNOTATING AN ELECTRONIC DOCUMENT

(75) Inventors: Charles J. Migos, San Bruno, CA (US); Jay Christopher Capela, Santa Cruz, CA (US); Markus Hagele, San Francisco, CA (US); Diego Bauducco, San Francisco, CA (US); Akiva D. Leffert, San Francisco, CA (US); Britt S. Miura, Menlo Park, CA (US); Donald Rozinak Beaver, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 731 days.

(21) Appl. No.: 13/076,407

(22) Filed: Mar. 30, 2011

(65) Prior Publication Data

US 2012/0188174 A1 Jul. 26, 2012

Related U.S. Application Data

(60) Provisional application No. 61/435,776, filed on Jan. 24, 2011.

(51) Int. Cl.
 *G06F 3/041* (2006.01)
 *G06F 3/0488* (2013.01)

(52) U.S. Cl.
 CPC .. *G06F 3/04883* (2013.01); *G06F 2203/04808* (2013.01)
 USPC ............ 345/173; 715/863; 715/776; 715/230

(58) Field of Classification Search
 CPC ... G06F 3/0488; G06F 3/04883; G06F 3/017; G06F 17/24; G06F 17/241; G06F 2203/04808; G06F 3/04886; G06F 3/048; G06F 3/0483; G06F 3/0485
 USPC ........................... 345/156–178; 715/718, 863
 See application file for complete search history.

(56) References Cited

U.S. PATENT DOCUMENTS 5,347,295 A 9/1994 Agulnick et al.
5,729,219 A * 3/1998 Armstrong et al. ............. 341/20

(Continued)

FOREIGN PATENT DOCUMENTS

EP 1 536 316 A1 6/2005
EP 1 703 363 A2 9/2006

(Continued)

OTHER PUBLICATIONS

Guimbretière, F., "Paper Augmented Digital Documents," UIST '03, Nov. 2003, Vancouver, BC, Canada, 10 pages.

(Continued)

*Primary Examiner* — Gregory J Tryder
(74) *Attorney, Agent, or Firm* — Morrison & Foerster LLP

(57) ABSTRACT

A device, configured to operate in a first operational mode at some times and in a second operational mode at other times, detects a first gesture having a first gesture type; in response to detecting the first gesture: in accordance with a determination that the device is in the first operational mode, performs an operation having a first operation type; and, in accordance with a determination that the device is in the second operational mode, performs an operation having a second operation type; detects a second gesture having a second gesture type; and in response to detecting the second gesture: in accordance with a determination that the device is in the first operational mode, performs an operation having the second operation type; and in accordance with a determination that the device is in the second operational mode, performs an operation having the first operation type.

21 Claims, 31 Drawing Sheets

(56) References Cited

U.S. PATENT DOCUMENTS

| | | |
|---|---|---|
| 6,037,937 A | 3/2000 | Beaton et al. |
| 6,154,758 A | 11/2000 | Chiang |
| 6,307,549 B1 | 10/2001 | King et al. |
| 6,486,895 B1 | 11/2002 | Robertson et al. |
| 6,842,182 B2 | 1/2005 | Ungar et al. |
| 6,924,822 B2 | 8/2005 | Card et al. |
| 6,944,818 B2 | 9/2005 | Newman et al. |
| 7,088,342 B2 * | 8/2006 | Rekimoto et al. ............ 345/169 |
| 7,176,888 B2 | 2/2007 | Marvit et al. |
| 7,185,274 B1 | 2/2007 | Rubin et al. |
| 7,190,349 B2 * | 3/2007 | Kim et al. .................... 345/168 |
| 7,434,177 B1 | 10/2008 | Ording et al. |
| 7,477,231 B2 | 1/2009 | Asai |
| 7,602,378 B2 | 10/2009 | Kocienda et al. |
| 7,768,501 B1 | 8/2010 | Maddalozzo, Jr. et al. |
| 8,033,744 B2 | 10/2011 | Baker |
| 8,365,059 B2 | 1/2013 | Walsh et al. |
| 8,368,658 B2 | 2/2013 | Brisebois et al. |
| 8,405,630 B1 | 3/2013 | Bi et al. |
| 2002/0028018 A1 | 3/2002 | Hawkins et al. |
| 2002/0118175 A1 | 8/2002 | Liebenow et al. |
| 2003/0001899 A1 | 1/2003 | Partanen et al. |
| 2003/0184528 A1 * | 10/2003 | Kawasaki et al. ............ 345/173 |
| 2003/0210272 A1 | 11/2003 | D'Souza |
| 2004/0021691 A1 | 2/2004 | Dostie et al. |
| 2004/0080487 A1 | 4/2004 | Griffin et al. |
| 2004/0100479 A1 | 5/2004 | Nakano et al. |
| 2004/0119750 A1 | 6/2004 | Harrison |
| 2004/0140984 A1 | 7/2004 | Hinckley et al. |
| 2004/0183834 A1 | 9/2004 | Chermesino |
| 2004/0230912 A1 | 11/2004 | Clow et al. |
| 2005/0154798 A1 | 7/2005 | Nurmi |
| 2005/0225538 A1 | 10/2005 | Verhaegh |
| 2005/0248525 A1 | 11/2005 | Asai |
| 2006/0007178 A1 | 1/2006 | Davis |
| 2006/0033724 A1 | 2/2006 | Chaudhri et al. |
| 2006/0055685 A1 | 3/2006 | Rimas-Ribikauskas et al. |
| 2006/0061542 A1 | 3/2006 | Stokie |
| 2006/0080621 A1 | 4/2006 | Park |
| 2006/0085757 A1 | 4/2006 | Andre et al. |
| 2006/0150087 A1 | 7/2006 | Cronenberger et al. |
| 2006/0164399 A1 | 7/2006 | Cheston et al. |
| 2006/0181518 A1 * | 8/2006 | Shen et al. .................... 345/173 |
| 2006/0197750 A1 | 9/2006 | Kerr |
| 2006/0242607 A1 | 10/2006 | Hudson |
| 2006/0265648 A1 | 11/2006 | Rainisto et al. |
| 2007/0097085 A1 | 5/2007 | Iwatsuki |
| 2007/0171210 A1 | 7/2007 | Chaudhri et al. |
| 2008/0036743 A1 | 2/2008 | Westerman et al. |
| 2008/0042978 A1 | 2/2008 | Perez-Noguera |
| 2008/0082920 A1 | 4/2008 | Eom |
| 2008/0115078 A1 | 5/2008 | Girgaonkar |
| 2008/0141126 A1 | 6/2008 | Johnson et al. |
| 2008/0158024 A1 | 7/2008 | Steiner et al. |
| 2008/0165144 A1 | 7/2008 | Forstall et al. |
| 2008/0180408 A1 | 7/2008 | Forstall et al. |
| 2008/0259057 A1 | 10/2008 | Brons |
| 2008/0297377 A1 | 12/2008 | Wang et al. |
| 2009/0052778 A1 | 2/2009 | Edgecomb et al. |
| 2009/0058815 A1 | 3/2009 | Jeon et al. |
| 2009/0058820 A1 | 3/2009 | Hinckley |
| 2009/0058823 A1 | 3/2009 | Kocienda |
| 2009/0091541 A1 | 4/2009 | Chen |
| 2009/0132957 A1 | 5/2009 | Reddy |
| 2009/0167706 A1 | 7/2009 | Tan et al. |
| 2009/0174669 A1 | 7/2009 | Shkolnikov |
| 2009/0174679 A1 | 7/2009 | Westerman |
| 2009/0195959 A1 | 8/2009 | Ladouceur et al. |
| 2009/0213081 A1 | 8/2009 | Case, Jr. |
| 2009/0225035 A1 | 9/2009 | Baik |
| 2009/0225041 A1 | 9/2009 | Kida et al. |
| 2009/0228842 A1 | 9/2009 | Westerman et al. |
| 2009/0231281 A1 | 9/2009 | Whytock et al. |
| 2009/0235281 A1 | 9/2009 | Lu et al. |
| 2009/0237359 A1 | 9/2009 | Kim et al. |
| 2009/0237361 A1 | 9/2009 | Mosby et al. |
| 2009/0241054 A1 | 9/2009 | Hendricks |
| 2009/0244020 A1 | 10/2009 | Sjolin |
| 2009/0247233 A1 | 10/2009 | Kim |
| 2009/0251422 A1 | 10/2009 | Wu et al. |
| 2009/0256817 A1 * | 10/2009 | Perlin et al. .................... 345/174 |
| 2009/0258677 A1 | 10/2009 | Ellis et al. |
| 2009/0267906 A1 | 10/2009 | Schroderus |
| 2009/0273566 A1 | 11/2009 | Lu et al. |
| 2009/0303200 A1 | 12/2009 | Grad |
| 2010/0020033 A1 | 1/2010 | Nwosu |
| 2010/0020034 A1 | 1/2010 | Kim |
| 2010/0058212 A1 | 3/2010 | Belitz et al. |
| 2010/0070613 A1 | 3/2010 | Chen et al. |
| 2010/0088641 A1 | 4/2010 | Choi |
| 2010/0103124 A1 | 4/2010 | Kruzeniski et al. |
| 2010/0105408 A1 | 4/2010 | Palmer et al. |
| 2010/0107050 A1 | 4/2010 | Wang et al. |
| 2010/0110017 A1 | 5/2010 | Lee |
| 2010/0141590 A1 | 6/2010 | Markiewicz et al. |
| 2010/0146459 A1 | 6/2010 | Repka |
| 2010/0153313 A1 | 6/2010 | Baldwin et al. |
| 2010/0156793 A1 | 6/2010 | Ozias et al. |
| 2010/0164959 A1 | 7/2010 | Brown et al. |
| 2010/0185949 A1 | 7/2010 | Jaeger |
| 2010/0194692 A1 | 8/2010 | Orr et al. |
| 2010/0214237 A1 | 8/2010 | Echeverri et al. |
| 2010/0231612 A1 | 9/2010 | Chaudhri et al. |
| 2010/0235794 A1 | 9/2010 | Ording |
| 2010/0238125 A1 | 9/2010 | Ronkainen |
| 2010/0241985 A1 | 9/2010 | Kim et al. |
| 2010/0259493 A1 | 10/2010 | Chang et al. |
| 2010/0259561 A1 | 10/2010 | Forutanpour et al. |
| 2010/0259562 A1 | 10/2010 | Miyazawa et al. |
| 2010/0277414 A1 | 11/2010 | Tartz et al. |
| 2010/0283743 A1 | 11/2010 | Coddington |
| 2010/0289756 A1 | 11/2010 | Anzures et al. |
| 2010/0293498 A1 | 11/2010 | Maxfield |
| 2010/0295781 A1 | 11/2010 | Alameh et al. |
| 2010/0299597 A1 | 11/2010 | Shin et al. |
| 2010/0315359 A1 | 12/2010 | Seong et al. |
| 2011/0006996 A1 | 1/2011 | Smith et al. |
| 2011/0007009 A1 | 1/2011 | Ishihara et al. |
| 2011/0039602 A1 | 2/2011 | McNamara et al. |
| 2011/0055753 A1 | 3/2011 | Horodezky et al. |
| 2011/0078560 A1 | 3/2011 | Weeldreyer et al. |
| 2011/0078614 A1 | 3/2011 | Lee et al. |
| 2011/0187647 A1 | 8/2011 | Woloszynski et al. |
| 2011/0191719 A1 | 8/2011 | Hinckley et al. |
| 2011/0199393 A1 | 8/2011 | Nurse et al. |
| 2011/0242138 A1 | 10/2011 | Tribble |
| 2011/0258537 A1 * | 10/2011 | Rives et al. .................... 715/255 |
| 2012/0096345 A1 | 4/2012 | Ho et al. |
| 2012/0110431 A1 * | 5/2012 | Rosenfeld et al. ............ 715/230 |
| 2012/0113007 A1 | 5/2012 | Koch et al. |
| 2012/0113023 A1 | 5/2012 | Koch et al. |
| 2012/0113024 A1 | 5/2012 | Koch et al. |
| 2012/0113025 A1 | 5/2012 | Koch et al. |
| 2012/0113026 A1 | 5/2012 | Koch |
| 2012/0113126 A1 | 5/2012 | Koch et al. |
| 2012/0117501 A1 | 5/2012 | Koch et al. |
| 2012/0117505 A1 | 5/2012 | Koch et al. |
| 2012/0117506 A1 | 5/2012 | Koch et al. |
| 2012/0120016 A1 | 5/2012 | Mittal et al. |
| 2012/0127206 A1 | 5/2012 | Thompson et al. |
| 2012/0139844 A1 | 6/2012 | Ramstein et al. |
| 2012/0162078 A1 | 6/2012 | Ferren et al. |
| 2012/0188174 A1 | 7/2012 | Migos et al. |
| 2012/0192093 A1 | 7/2012 | Migos et al. |
| 2012/0206363 A1 | 8/2012 | Kyprianou et al. |
| 2012/0206370 A1 | 8/2012 | Ivanovic |
| 2013/0016129 A1 | 1/2013 | Gossweiler, III et al. |

(56) References Cited

U.S. PATENT DOCUMENTS

| | | |
|---|---|---|
| 2013/0057475 A1 | 3/2013 | Duggan et al. |
| 2013/0067382 A1 | 3/2013 | Townsend et al. |
| 2013/0167013 A1 | 6/2013 | Poliak |

FOREIGN PATENT DOCUMENTS

| | | |
|---|---|---|
| EP | 2 105 823 A1 | 9/2009 |
| EP | 2 109 031 A2 | 10/2009 |
| EP | 2 133 778 A2 | 12/2009 |
| EP | 2 341 414 A1 | 7/2011 |
| GB | 2 402 105 A | 12/2004 |
| JP | 2005 244301 | 9/2005 |
| JP | 2007 279638 | 10/2007 |
| WO | WO 00/74240 A1 | 12/2000 |
| WO | WO 02/15211 A1 | 2/2002 |
| WO | WO 03/062978 A2 | 7/2003 |
| WO | WO 2004/006080 A2 | 1/2004 |
| WO | WO 2005/033856 A2 | 4/2005 |
| WO | WO 2005/076477 A1 | 8/2005 |
| WO | WO 2007/014064 A2 | 2/2007 |
| WO | WO 2007/089766 A2 | 8/2007 |
| WO | WO 2009/049331 A2 | 4/2009 |
| WO | WO 2010/018579 A2 | 2/2010 |
| WO | WO 2010/089740 A1 | 8/2010 |
| WO | WO 2011/123099 A1 | 10/2011 |
| WO | WO 2012/083499 A1 | 6/2012 |

OTHER PUBLICATIONS

International Preliminary Report on Patentability dated May 16, 2013, received in International Application No. PCT/US2011/059085, which corresponds to U.S. Appl. No. 13/076,389, 10 pages (Koch).
International Preliminary Report on Patentability dated May 16, 2013, received in International Application No. PCT/US2011/059088, which corresponds to U.S. Appl. No. 13/076,392, 10 pages (Koch).
International Preliminary Report on Patentability dated Jul. 4, 2013, received in International Patent Application No. PCT/US2011/059092, which corresponds to U.S. Appl. No. 13/076,395, 16 pages (Koch).
International Preliminary Report on Patentability dated May 16, 2013, received in International Application No, PCT/US2011/059101, which corresponds to U.S. Application No. PCT/US2011/059101, 10 pages (Koch).
International Preliminary Report on Patentability dated May 16, 2013, received in International Patent No. PCT/US2011/059106, which corresponds to U.S. Appl. No. 13/076,391, 10 pages (Koch).
International Preliminary Report on Patentability dated May 16, 2013, received in International Application No. PCT/US2011/059204, which corresponds to U.S. Appl. No. 13/243,599, 8 pages (Koch).
International Search Report and Written Opinion dated Jul. 24, 2013, received in International Application No. PCT/US2013/037423, which corresponds to U.S. Appl. No. 13/797,979, 11 pages (Koch).
Notice of Allowance dated May 2,2013, received in U.S. Appl. No. 13/076,389, 9 pages (Koch).
Notice of Allowance dated May 28, 2013, received in U.S. Appl. No. 13/076,389, 10 pages (Koch).
Office Action dated Nov. 2, 2012, received in U.S. Appl. No. 13/076,392, 9 pages (Koch).
Notice of Allowance dated Aug. 6, 2013, received in U.S. Appl. No. 13/076,392, 14 pages (Koch).
Notice of Allowance dated Jul. 18, 2013, received in U.S. Appl. No. 13/076,401, 10 pages (Koch).
Office Action dated Jun. 13, 2013, received in U.S. Appl. No. 13/076,411, 15 pages (Migos).
Office Action dated Aug. 21, 2013, received in U.S. Appl. No. 13/076,414, 14 pages (Migos).
Office Action dated Jul. 15, 2013, received in U.S. Appl. No. 13/077,754, 17 pages (Migos).
Office Action dated Feb. 7, 2013, received in U.S. Appl. No. 13/076,391, 20 pages (Koch).
Blind Type, "Touch typing the way it should be," 2010, 2 pages.
Concept Phones, "Apple Tablet," Concept Phones.com, Dec. 16, 2009, http://www.concept-phones.com/?s=apple+tablet, 21 pages.
G.P. Imports. "Keyboard Upgrade," G.P. Imports, Inc. , updated May 20, 2010, 8 pages.
Gizmodo, "How Will We Type on the Apple Tablet?", Gizmodo.com, Jan. 12, 2010, http://gizmodo.com/5446652/how-will-we-type-on-the-apple-tablet, 5 pages.
Robbin, S., "Concept: iPad Split Keyboard," Jan. 27, 2010, http://srobbin.com/blog/concept-ipad-split-keyboard/, 3 pages.
Surur, "Microsoft patents cool multi-touch virtual keyboard," wmpoweruser.com, Sep. 25, 2009, http://wmpoweruser.com/microsoft-patents-cool-multi-touch-virtual-keyboard/.
Tidwell, J., "Magnetism," from Designing Interfaces, Copyright © 2006 O'Reilly Media, Inc., pp. 279-280.
Toshiba, "Libretto® W100," Jun. 2010, 9 pages.
Dutch Search Report dated May 23, 2012, received in Dutch Patent Application No. 2007725, which corresponds to U.S. Appl. No. 13/076,395, 12 pages (Koch).
Dutch Search Report dated May 14, 2012, received in Dutch Patent Application No. 2007719, which corresponds to U.S. Appl. No. 13/076,393, 10 pages (Koch).
Dutch Search Report dated May 14, 2012, received in Dutch Patent Application No. 2007718, which corresponds to U.S. Appl. No. 13/076,391,10 pages (Koch).
Office Action dated Nov. 2, 2012, received in U.S. Appl. No. 13/076,392. 9 pages (Koch).
Ajidev, "iAnnotate," ajidev.com. 2010, www.ajidev.com/iannotate, 2 pages.
Ajidev, "Welcome to iAnnotate v 1.3!" Ajidev.com. 2010, www.ajidev.com, 37 pages.
Chen et al., "Navigation Techniques for Dual-Display E-Book Readers," CHI 2008 Proceedings, Apr. 2008, Florence. Italy, 10 pages.
Find eBook Readers, "PDF on the iPad-iAnnotate Review-Annotations?" Find eBook Readers Blog, May 2010, http://findebookreaders.com/blog/2010/05/pdf-on-the-ipad-iannotate-review-annotations/, 9 pages.
Goodiware, "GoodReader User Manual; Viewing PDF Files," goodiware.com, 2010, http://www.goodreader.net/gr-man-view-pdf.html#annots, 11 pages.
Lee et al., "smartNote for iPad User Guide," mysmartnote.net, Version 1.4, 2010, http://mysmartnet.net, 17 pages.
Mobipocket, "Mobipocket Reader Desktop 6.2," Mobipocket.com, 2010, http://www.mobipocket.com/en/downloadsoft/productdetailsreader.asp, 3 pages.
Readdle Inc., "PDF Expert for iPad User's Guide," Readdle Inc., 2010, 15 pages.
Vimeo, "Smart Design magazine UX concept," vimeo.com. 2010, http://vimeo.com/10813230, 2 pages.
Willems et al., "Pen gestures in online map and photograph annotation tasks," Oct. 2006, 6 pages.
International Search Report and Written Opinion dated May 23, 2011, received in International Application No. PCT/US2011/029957, which corresponds to U.S. Appl. No. 12/752,003, 11 pages (Tribble).
Dutch Search Report and Written Opinion dated May 4, 2012, received in Dutch Patent Application No. 2007721, which corresponds to U.S. Appl. No. 13/076,389, 16 pages (Koch).
International Search Report and Written Opinion dated May 7, 2012, received in International Application No. PCT/US2011/059085, which corresponds to U.S. Appl. No. 13/076,389, 17 pages (Koch).
Dutch Search Report and Written Opinion dated May 4, 2012, received in Dutch Patent Application No. 2007723, which corresponds to U.S. Appl. No. 13/076,392, 10 pages (Koch).
International Search Report and Written Opinion dated May 7, 2012, received in International Application No. PCT/US2011/059088, which corresponds to U.S. Appl. No. 13/076,392, 12 pages (Koch).
Invitation to pay Additional Fees dated May 23, 2012, received in International Patent Application No. PCT/US2011/059092, which corresponds to U.S. Appl. No. 13/076,395, 9 pages (Koch).

(56) References Cited

OTHER PUBLICATIONS

International Search Report and Written Opinion dated Feb. 11, 2013, received in International Application No. PCT/US2011/059092, which corresponds to U.S. Appl. No. 13/076,395, 35 pages (Koch).
International Search Report and Written Opinion dated May 7, 2012, received in International Application No. PCT/US2011/059101, which corresponds to U.S. Appl. No. 13/076,393, 12 pages (Koch).
International Search Report and Written Opinion dated May 7, 2012, received in International Application No. PCT/US2011/059106, which corresponds to U.S. Appl. No. 13/076,391, 13 pages (Koch).
Dutch Search Report and Written Opinion dated May 4, 2012, received in Dutch Patent Application No. 2007722, which corresponds to U.S. Appl. No. 13/243,599, 10 pages (Koch).
International Search Report and Written Opinion dated May 7, 2012, received in International Application No. PCT/US2011/059204, which corresponds to U.S. Appl. No. 13/243,599, 10 pages (Koch).
Office Action dated Feb. 22, 2013, received in U.S. Appl. No. 12/752,003, 39 pages (Tribble).
Office Action dated Oct. 3, 2012, received in U.S. Appl. No. 13/076,389, 11 pages (Koch).
Office Action dated Dec. 13, 2012, received in U.S. Appl. No. 13/076,395, 17 pages (Koch).
Office Action dated Dec. 14, 2012, received in U.S. Appl. No. 13/076,397, 20 pages (Koch).
Office Action dated Feb. 12, 2013, received in U.S. Appl. No. 13/076,399, 28 pages (Koch).
Office Action dated Dec. 17, 2012, received in U.S. Appl. No. 13/076,401, 16 pages (Koch).
Office Action dated Nov. 9, 2012, received in U.S. Appl. No. 13/077,754, 9 pages (Migos).
Office Action dated Nov. 2, 2012, received in U.S. Appl. No. 13/076,393, 8 pages (Koch).
Office Action dated Jan. 17, 2013, received in U.S. Appl. No. 13/243,599, 17 pages (Koch).
Office Action dated Sep. 19, 2013, received in U.S. Appl. No. 12/752,003, 49 pages (Tribble).
Office Action dated Oct. 23, 2013, received in U.S. Appl. No. 13/076,395, 18 pages (Koch).
Notice of Allowance dated Sep. 16, 2013, received in U.S. Appl. No. 13/076,397, 19 pages (Koch).
Notice of Allowance dated Oct. 10, 2013, received in U.S. Appl. No. 13/076,399, 15 pages (Koch).
Final Office Action dated Nov. 15, 2013, received in U.S. Appl. No. 13/076,411, 14 pages (Migos).
Notice of Allowance dated Oct. 3, 2013, received in U.S. Appl. No. 13/076,393, 23 pages (Koch).
Office Action dated Nov. 7, 2013, received in U.S. Appl. No. 13/076,391, 14 pages (Koch).
Notice of Allowance dated Aug. 6, 2013, received in U.S. Appl. No. 13/243,599, 14 pages (Koch).
Examiner's Report dated Aug. 5, 2013 received in Australian Patent Application No. 2011323269, which corresponds to U.S. Appl. No. 13/243,599, 3 pages (Koch).
Office Action dated Dec. 9, 2013, received in Korean Patent Application No. 20127030352, which corresponds to U.S. Appl. No. 13/243,599, 3 pages (Koch).

\* cited by examiner

DEVICE, METHOD, AND GRAPHICAL USER INTERFACE FOR NAVIGATING AND ANNOTATING AN ELECTRONIC DOCUMENT

RELATED APPLICATIONS

This application claims priority to U.S. Provisional Application Ser. No. 61/435,776, filed Jan. 24, 2011, entitled "Device, Method, and Graphical User Interface for Navigating and Annotating an Electronic Document," which is incorporated by reference herein in its entirety.

This application is related to the following: (1) U.S. application Ser. No. 13/076,411, filed, Mar. 30, 2011, entitled "Device, Method, and Graphical User Interface for Navigating and Annotating an Electronic Document," and (2) U.S. application Ser. No. 13/076,414, filed Mar. 30, 2011, entitled "Device, Method, and Graphical User Interface for Navigating and Annotating an Electronic Document," which are incorporated by reference herein in their entireties.

TECHNICAL FIELD

This relates generally to electronic devices with touch-sensitive surfaces, including but not limited to electronic devices with touch-sensitive surfaces that are used to navigate and annotate an electronic document.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include navigating through, and annotating an electronic document, such as an electronic book, newspaper, or magazine. A user may need to perform such manipulations in an electronic book or document reader application or in a digital publication application, for example.

But existing methods for navigating and annotating are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for navigating and annotating an electronic document. Such methods and interfaces may complement or replace conventional methods for navigating and annotating an electronic document. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The device is configured to operate in a first operational mode at some times and in a second operational mode distinct from the first operational mode at other times. The method includes detecting a first gesture on the touch-sensitive surface having a first gesture type, and in response to detecting the first gesture: in accordance with a determination that the device is in the first operational mode, performing an operation having a first operation type, and in accordance with a determination that the device is in the second operational mode, performing an operation having a second operation type distinct from the first operation type. The method also includes detecting a second gesture on the touch-sensitive surface having a second gesture type distinct from the first gesture type, and in response to detecting the second gesture: in accordance with a determination that the device is in the first operational mode, performing an operation having the second operation type, and in accordance with a determination that the device is in the second operational mode, performing an operation having the first operation type.

In accordance with some embodiments, an electronic device includes a display, a touch-sensitive surface, one or more processors, memory, and one or more programs. The device is configured to operate in a first operational mode at some times and in a second operational mode distinct from the first operational mode at other times. The one or more programs are stored in the memory and configured to be executed by the one or more processors and the one or more programs include instructions for performing the operations of the method described above. In accordance with some embodiments, a graphical user interface on an electronic device with a display, a touch-sensitive surface, a memory, and one or more processors to execute one or more programs stored in the memory includes one or more of the elements displayed in the method described above, which are updated in response to inputs, as described in the method above. In accordance with some embodiments, a non-transitory computer readable storage medium has stored therein instructions which when executed by an electronic device with a display and a touch-sensitive surface cause the device to perform the operations of the method described above. In accordance with some embodiments, an electronic device includes: a display; a touch-sensitive surface; and means for performing the operations of the method described above. In accordance with some embodiments, an information processing apparatus, for use in an electronic device with a display and a touch-sensitive surface, includes means for performing the operations of the method described above.

In accordance with some embodiments, a method is performed at an electronic device with a touch-sensitive display and a touch-sensitive surface that is distinct from the touch-sensitive display. The method includes detecting a predefined gesture, and in response to detecting the predefined gesture, displaying a character input user interface on the display. In accordance with detection of the predefined gesture on the touch-sensitive surface, the character input user interface includes a split keyboard. In accordance with detection of the predefined gesture on the touch-sensitive display, the character input user interface includes an unsplit keyboard.

In accordance with some embodiments, an electronic device includes a touch-sensitive display, a touch-sensitive surface distinct from the touch-sensitive display, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a touch-sensitive display, a touch-sensitive surface distinct from the touch-sensitive display, a memory, and one or more processors to execute one or more programs stored in the memory includes one or more of the elements displayed in the method described above, which are updated in response to inputs, as described in any of the methods above. In accordance with some embodiments, a computer readable storage medium has stored therein instructions which when executed by an electronic device with a touch-sensitive display and a touch-sensitive surface distinct from the touch-sensitive display, cause the device to perform the operations of the method described above. In accordance with some embodiments, an electronic device includes: a touch-sensitive display, and a touch-sensitive surface distinct from the touch-sensitive display, and means for performing the operations of the method described above. In accordance with some embodiments, an information processing apparatus, for use in an electronic device with a touch-sensitive display and a touch-sensitive surface distinct from the touch-sensitive display, includes means for performing the operations of the method described above.

In accordance with some embodiments, a method is performed at an electronic device with a display and a touch-sensitive surface. The method includes displaying a document having a user-specified highlighted area that includes highlighting of a first type, detecting a contact at an initial contact location on the touch-sensitive surface that corresponds to an initial location on the display, detecting movement of the contact on the touch-sensitive surface, and, in response to detecting the movement of the contact on the touch-sensitive surface, in accordance with a determination that the initial location on the display is within the highlighted area, adding highlighting of a second type distinct from the first type to at least a portion of the highlighted area.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a display and a touch-sensitive surface, cause the device to perform the operations of any of the methods described above. In accordance with some embodiments, an electronic device includes: a display; a touch-sensitive surface; means for performing the operations of any of the methods described above. In accordance with some embodiments, an information processing apparatus, for use in an electronic device with a display and a touch-sensitive surface, includes means for performing the operations of any of the methods described above.

In accordance with some embodiments, an electronic device, configured to operate in a first operational mode at some times and in a second operational mode distinct from the first operational mode at other times, includes a display unit; a touch-sensitive surface unit configured to receive user gestures; and a processing unit coupled to the display unit and the touch-sensitive surface unit. The processing unit is configured to detect a first gesture on the touch-sensitive surface unit having a first gesture type, and in response to detecting the first gesture: in accordance with a determination that the electronic device is in the first operational mode, perform an operation having a first operation type; and in accordance with a determination that the electronic device is in the second operational mode, perform an operation having a second operation type distinct from the first operation type. The processing unit is also configured to detect a second gesture on the touch-sensitive surface unit having a second gesture type distinct from the first gesture type; and in response to detecting the second gesture: in accordance with a determination that the electronic device is in the first operational mode, perform an operation having the second operation type; and in accordance with a determination that the electronic device is in the second operational mode, perform an operation having the first operation type.

In accordance with some embodiments, an electronic device includes a touch-sensitive display unit configured to receive user gestures; a touch-sensitive surface unit, distinct from the touch-sensitive display unit, configured to receive user gestures; and a processing unit coupled to the touch-sensitive display unit and the touch-sensitive surface unit. The processing unit is configured to detect a predefined gesture, and in response to detecting the predefined gesture, enable display of a character input user interface on the touch-sensitive display unit. In accordance with detection of the predefined gesture on the touch-sensitive surface unit, the character input user interface includes a split keyboard. In accordance with detection of the predefined gesture on the touch-sensitive display unit, the character input user interface includes an unsplit keyboard.

In accordance with some embodiments, an electronic device includes a display unit configured to display a document having a user-specified highlighted area that includes highlighting of a first type; a touch-sensitive surface unit configured to receive user gestures; and a processing unit coupled to the display unit and the touch-sensitive surface unit. The processing unit is configured to detect a contact at an initial contact location on the touch-sensitive surface unit that corresponds to an initial location on the display unit, detect movement of the contact on the touch-sensitive surface unit, and, in response to detecting the movement of the contact on the touch-sensitive surface unit, in accordance with a determination that the initial location on the display unit is within the highlighted area, add highlighting of a second type distinct from the first type to at least a portion of the highlighted area.

Thus, electronic devices with displays and touch-sensitive surfaces are provided with faster, more efficient methods and interfaces for navigating and annotating an electronic document, thereby increasing the effectiveness, efficiency, and user satisfaction with such devices. Such methods and interfaces may complement or replace conventional methods for navigating and annotating an electronic document.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
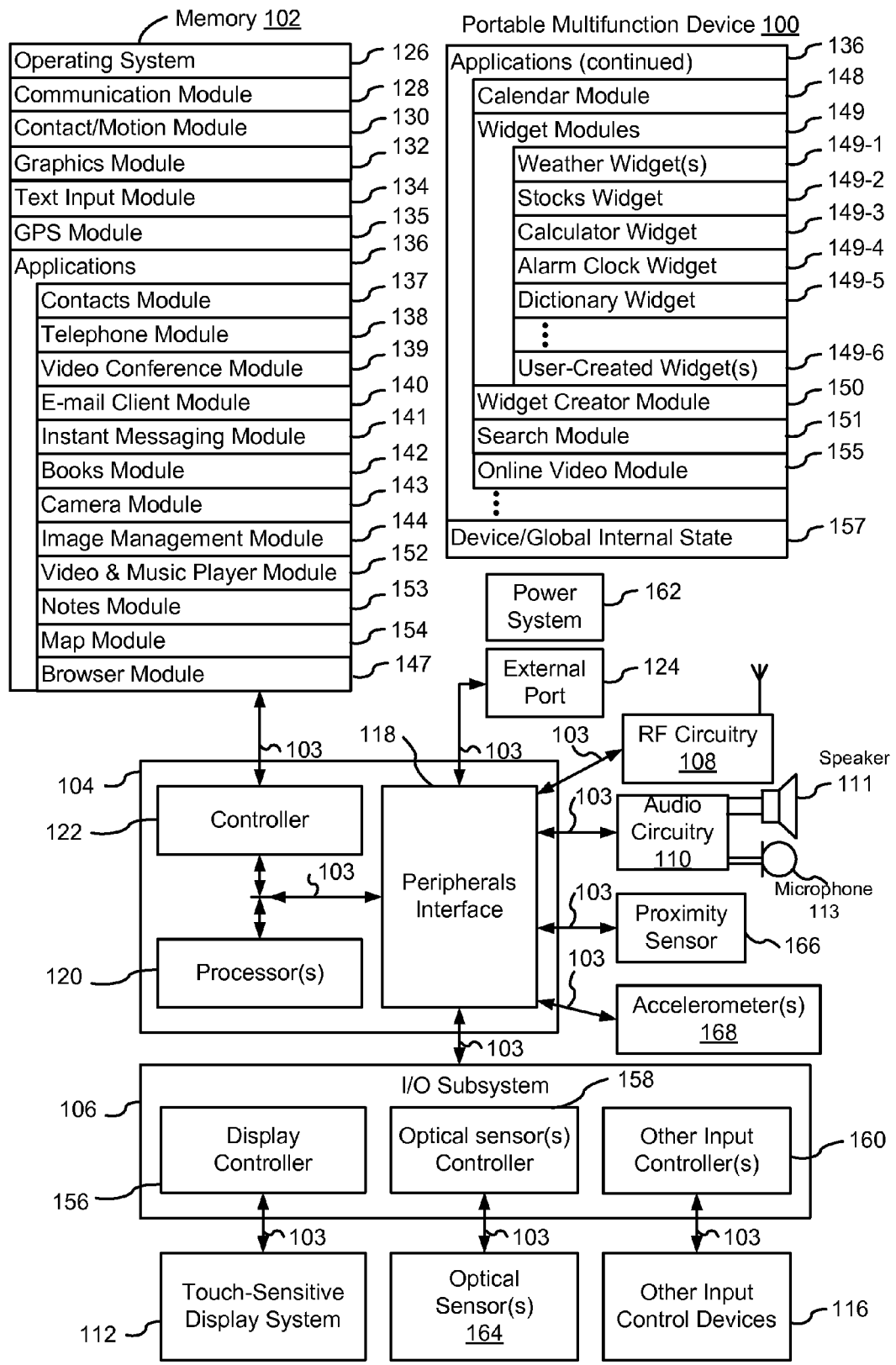
FIG. 1A is a block diagram illustrating a portable multifunction device with a touch-sensitive display in accordance with some embodiments.

Described below are devices and methods that enable a user to manipulate electronic documents, including navigating and annotating the electronic document and accessing character input interfaces.

In one method, a first gesture activates a first operation (e.g., a navigation operation such as turning a page in the electronic document) when the device is operating in a first mode (e.g., a navigation mode). The same first gesture activates a second operation (e.g., an annotation operation such as highlighting a portion of the page) when the device is operating in a second mode (e.g., an annotation mode). Conversely, a second gesture activates the first operation (e.g., the navigation operation) when the device is operating in the second mode (e.g., the annotation mode). The same second gesture activates the second operation (e.g., the annotation operation) when the device is operating in the first mode (e.g., the navigation mode). The first gesture is typically a simpler gesture than the second gesture. For example, the first gesture is a drag gesture and the second gesture is a tap and drag gesture. Thus, for example, simpler gestures are used to perform navigation operations when the device is in a navigation mode and the same simpler gestures are used to perform annotation operations when the device in an annotation mode. Yet annotation operations may still be performed when in the navigation mode (without switching to the annotation mode) by using the more complex gestures. Similarly, navigation operations may still be performed when in the annotation mode (without switching to the navigation mode) by using the same more complex gestures.

In another method, the device displays an unsplit or split keyboard depending on where a gesture to activate display of the keyboard is detected. The unsplit keyboard is displayed if the gesture is detected on the device's touch-sensitive display. The split keyboard is displayed if the gesture is detected on a touch-sensitive surface distinct from the touch-sensitive display (e.g., a touch-sensitive surface on the backside of the device). By displaying an unsplit or split keyboard depending on which touch-sensitive surface the gesture is performed on, the device displays a keyboard best suited to how the device is supported at that moment. When the gesture is performed on the touch sensitive display, the device is likely resting on a surface and thus suited for ten-finger typing with an unsplit keyboard. When the gesture is performed on the backside of the device, the device is likely being held by the user with the user's non-thumb fingers and thus suited for two-thumb typing using a split keyboard.

In another method, the device enables a user to easily and efficiently add a second type of highlighting to text already highlighted with a first type of highlighting. When text is displayed with one type of highlighting, in response to a gesture detected within the highlighted area, the device adds highlighting of a second type to the text along the path of the gesture. The second level of highlighting allows the user to add additional emphasis to parts of already-highlighted text.

Below, FIGS. 1A-1B, 2, 3, and 9-11 provide a description of exemplary devices. FIGS. 4A-4B and 5A-5Q illustrate exemplary user interfaces for navigating and annotating an electronic document. FIGS. 6A-6C, 7, and 8A-8B are flow diagrams illustrating methods of navigating and annotating an electronic document and displaying character input areas. The user interfaces in FIGS. 5A-5Q are used to illustrate the processes in FIGS. 6A-6C, 7, and 8A-8B.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
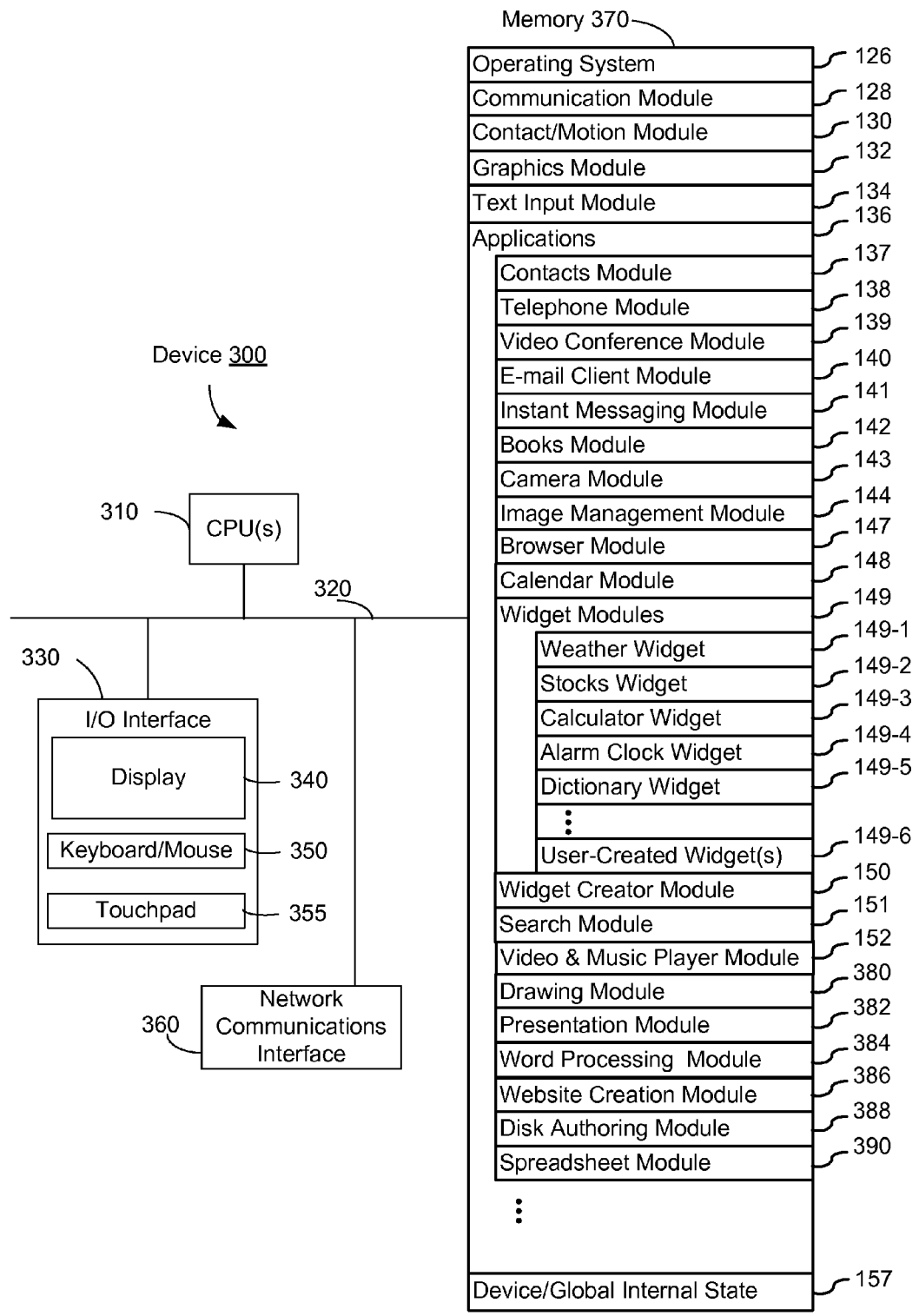
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- books module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, books module 142 includes executable instructions to display, annotate, and share an electronic book (e.g., a text book), magazine, newspaper or other digital publication between a user and one or more other participants in accordance with user instructions.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
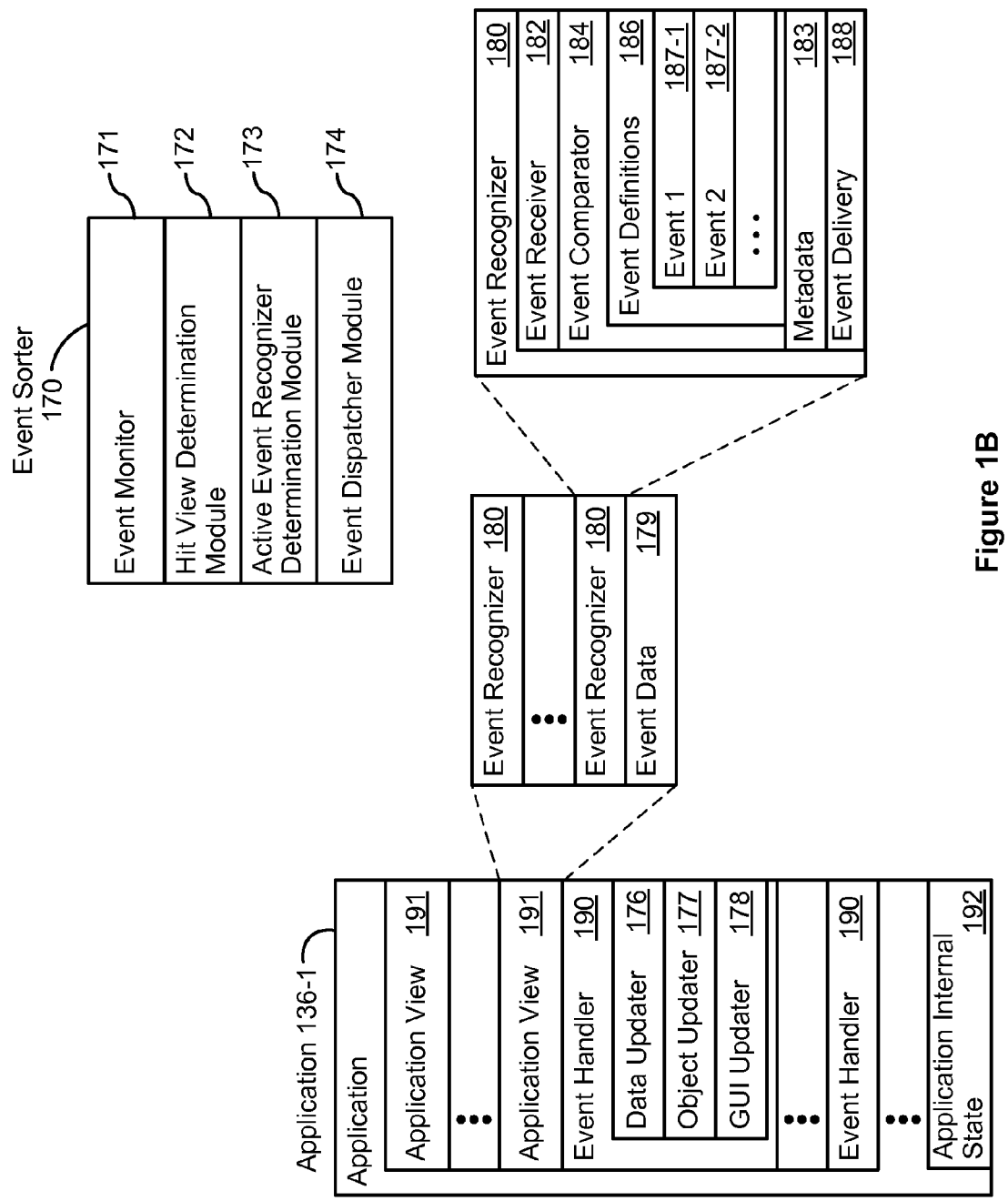
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
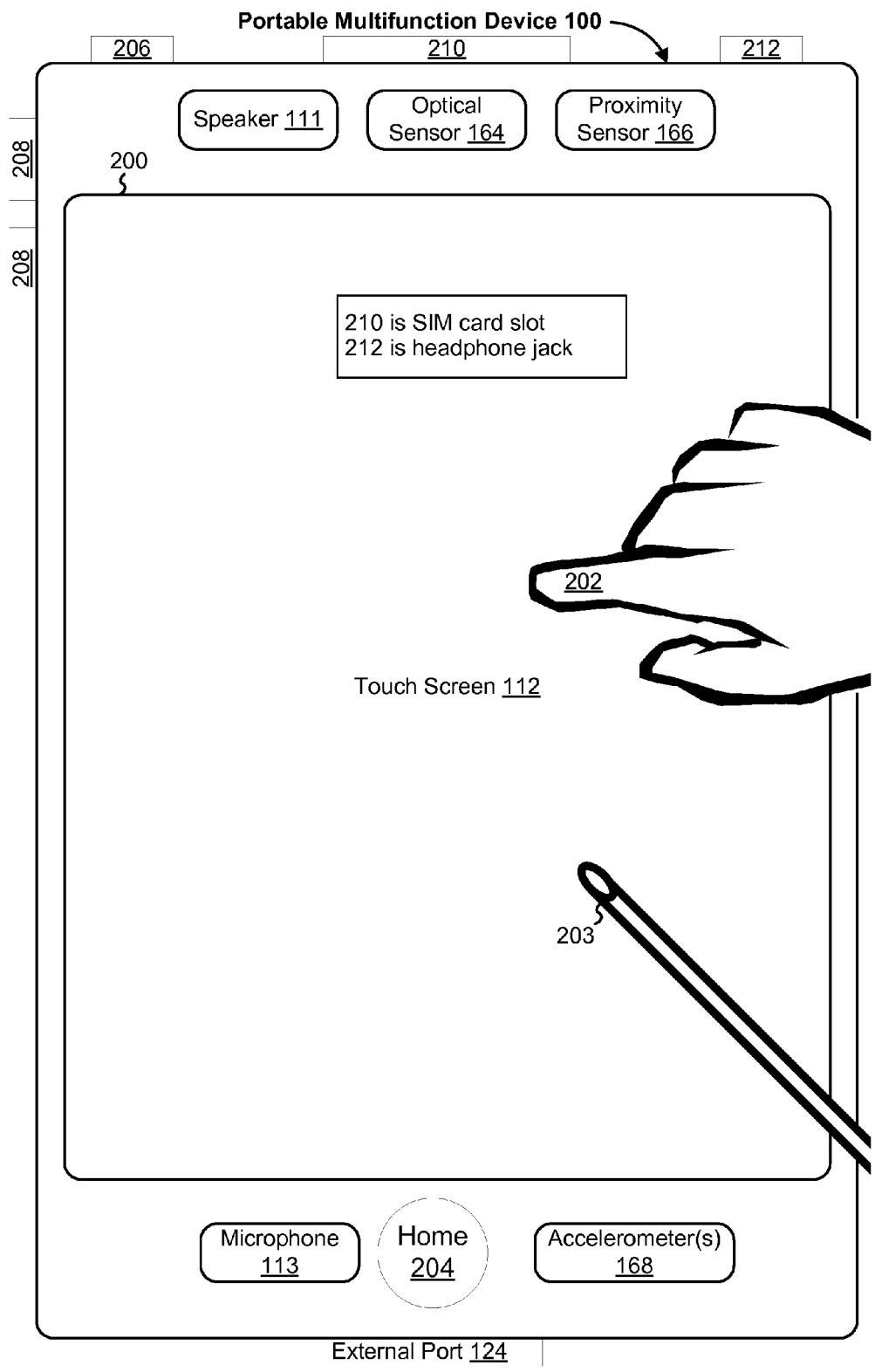
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
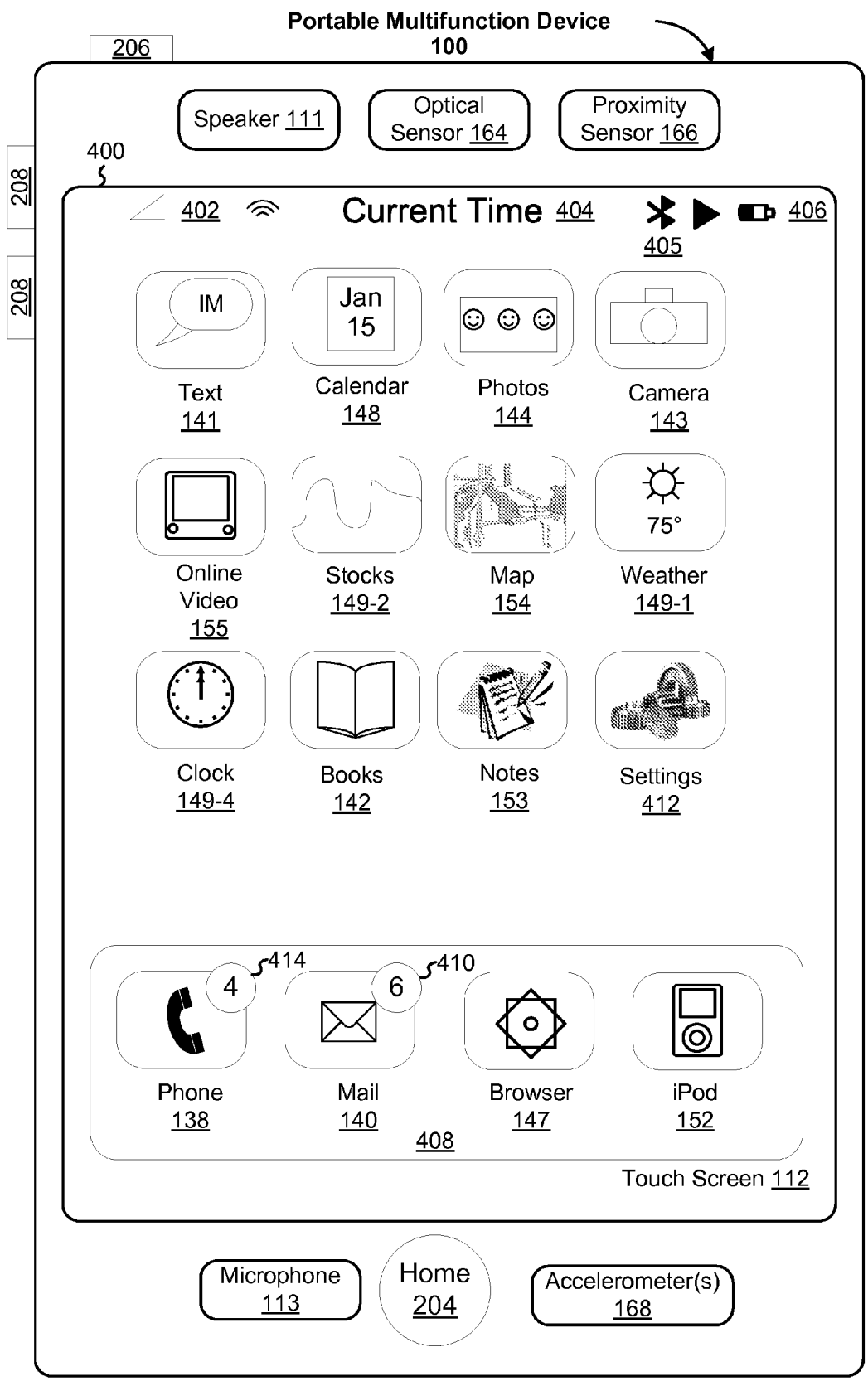
FIG. 4A illustrates an exemplary user interface for a menu of applications on a portable multifunction device in accordance with some embodiments.
Figure 5A:
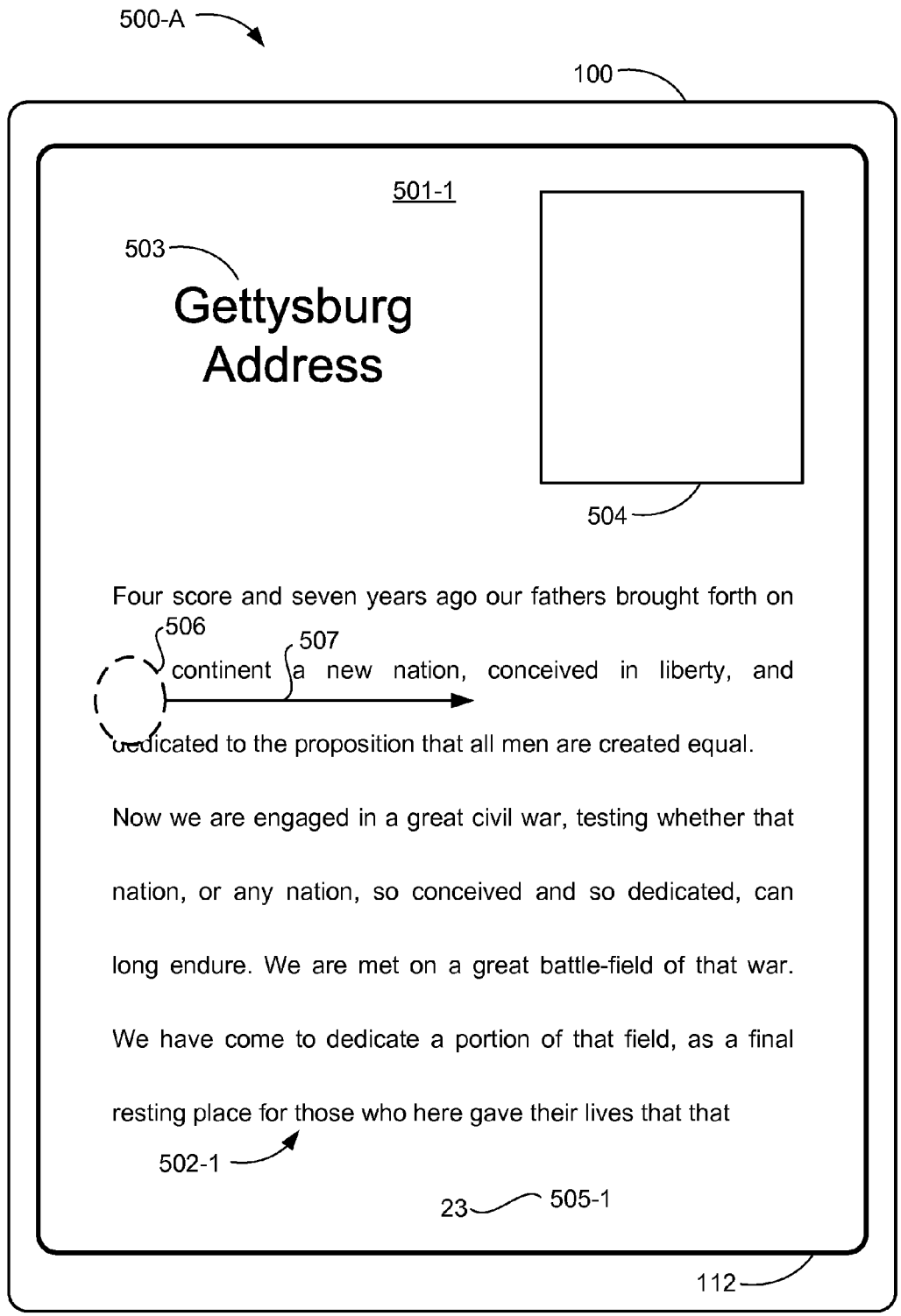
FIGS. 5A-5Q illustrate exemplary user interfaces for navigating and annotating an electronic document, in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Video and music player 152, also referred to as iPod (trademark of Apple Inc.) module 152; and
- Icons for other applications, such as:
  - IM 141;
  - Image management 144;
  - Camera 143;
  - Weather 149-1;
  - Stocks 149-2;
  - Books 142;
  - Calendar 148;
  - Alarm clock 149-4;
  - Map 154;
  - Notes 153;
  - Settings 412, which provides access to settings for device 100 and its various applications 136; and
  - Online video module 155, also referred to as YouTube (trademark of Google Inc.) module 155.

Figure 4B:
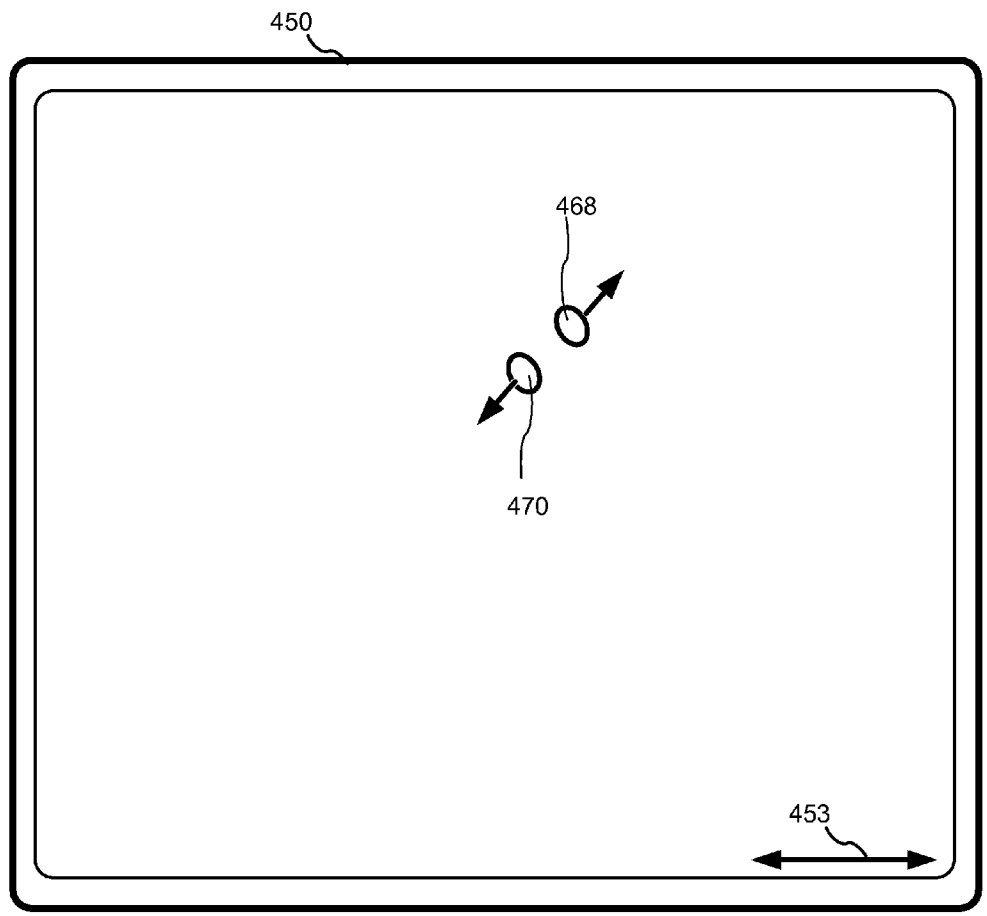
FIG. 4B illustrates an exemplary user interface for a multifunction device with a touch-sensitive surface that is separate from the display in accordance with some embodiments.
Figure 4B:
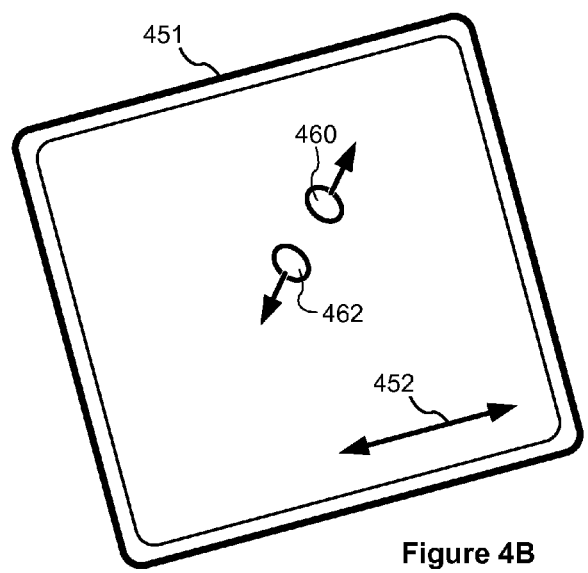

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5Q illustrate exemplary user interfaces for navigating and annotating an electronic document in accordance with some embodiments. The user interfaces in these figures are used to illustrate the processes described below, including the processes in FIGS. 6A-6C, 7, 8A-8B.

FIG. 5A illustrates user interface (UI) 500-A. UI 500-A includes a page of an electronic document (e.g., an electronic textbook, electronic book, electronic magazine, a Portable Document Format (PDF) document, word processing document, webpage, spreadsheet, desktop publishing document, slideshow document, drawing document, etc.) displayed on touch-sensitive display 112 of a device (e.g., device 100). Electronic document 501 includes content, such as text (e.g., body text 502, title or heading text 503) and graphical objects 504 (e.g., photos, charts, graphs, figures, etc.). In some embodiments, a page number 505 is also displayed; page number 505-1 shows that page 23 of electronic document 501-1 is being displayed on display 112.

In some embodiments, electronic document 501 is displayed on display 112 in one of two modes—a navigation mode or an annotation mode. When electronic document 501 is displayed in navigation mode, the focus is on efficient navigation (e.g., navigating between pages and between chapters, scrolling, etc.); simple gestures are directed to navigation operations, and more complex gestures (e.g., composite gestures with multiple components, such as a tap plus a swipe) are directed to other operations or features (e.g., annotation). When electronic document 501 is displayed in annotation mode, the focus is on efficient annotation (e.g., commenting, highlighting, bookmarking, etc.); simple gestures are directed to annotation operations, and more complex gestures are directed to other operations or features (e.g., navigation). In FIG. 5A, electronic document 501 is displayed in navigation mode.

Gesture 506 by a user is detected on touch-sensitive display 112. Gesture 506 includes movement in direction 507. In some embodiments, gesture 506 is a swipe or drag gesture.

Figure 5B:
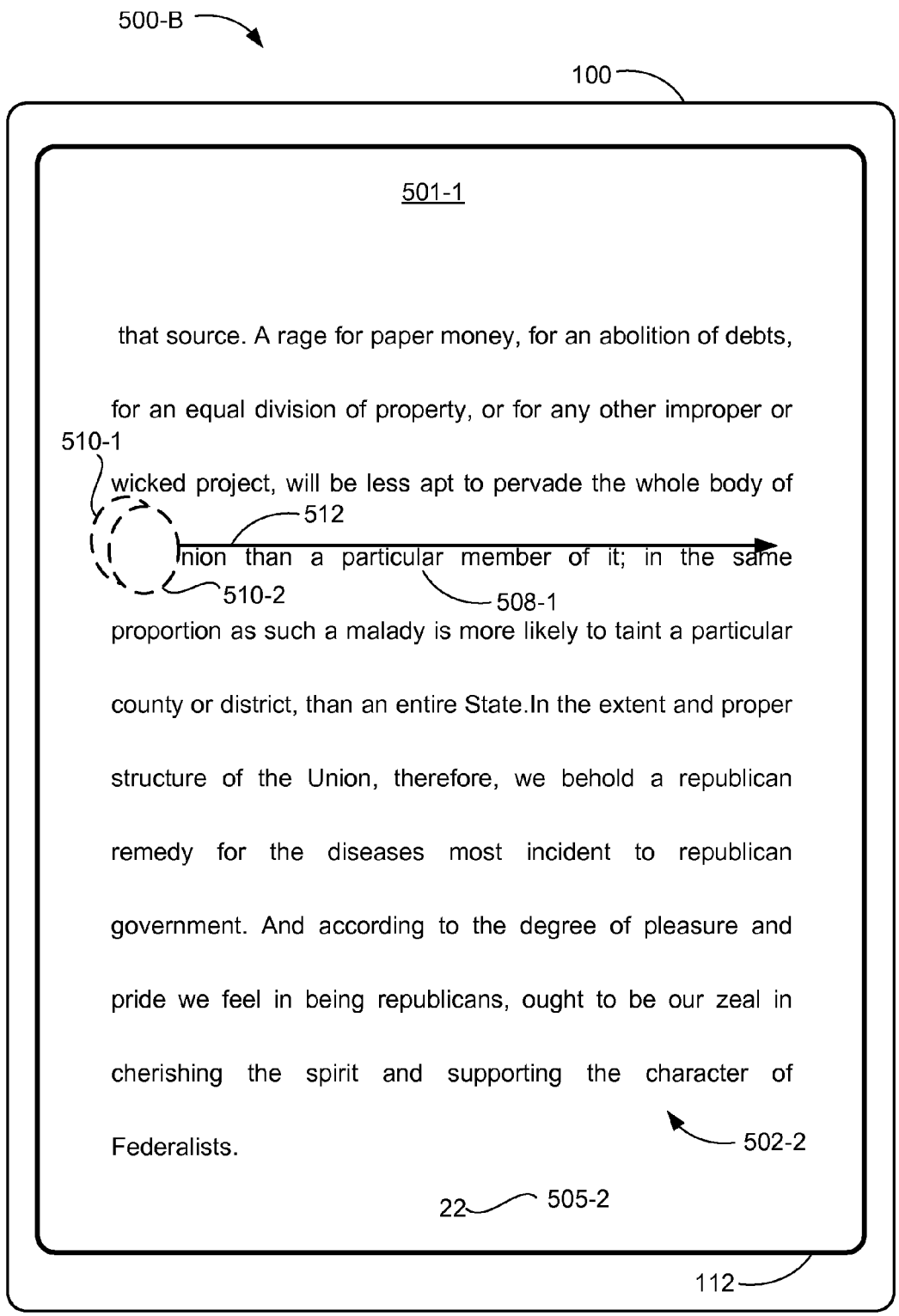

FIG. 5B illustrates UI 500-B, which includes a page 22 of electronic document 501-1, as indicated by page number 505-2, displayed on display 112 in navigation mode. In response to detection of gesture 506 (FIG. 5A), device 100 replaces page 23 of electronic document 501-1 (FIG. 5A) with page 22 of electronic document 501-1; device 100 navigates to a different page within electronic document 501-1. Page 22, as with page 23, may include content, such as text (e.g., body text 502-2) and graphical objects.

In FIG. 5B, gesture 510 by the user is detected on touch-sensitive display 112 over text portion 508-1. Gesture 510 includes movement in direction 512. In some embodiments, gesture 506 is a tap plus swipe (or tap plus drag) gesture, where the finger digit taps (510-1) touch-sensitive display 112, then contacts touch-sensitive display again and swipes (510-2) (or drags) across display 112 in direction 512. In some embodiments, a virtual loupe is displayed when gesture 510-2 is detected; the loupe magnifies for the user the text in proximity of the contact in gesture 510-2 as gesture 510-2 moves on touch-sensitive display 112.

Figure 5C:
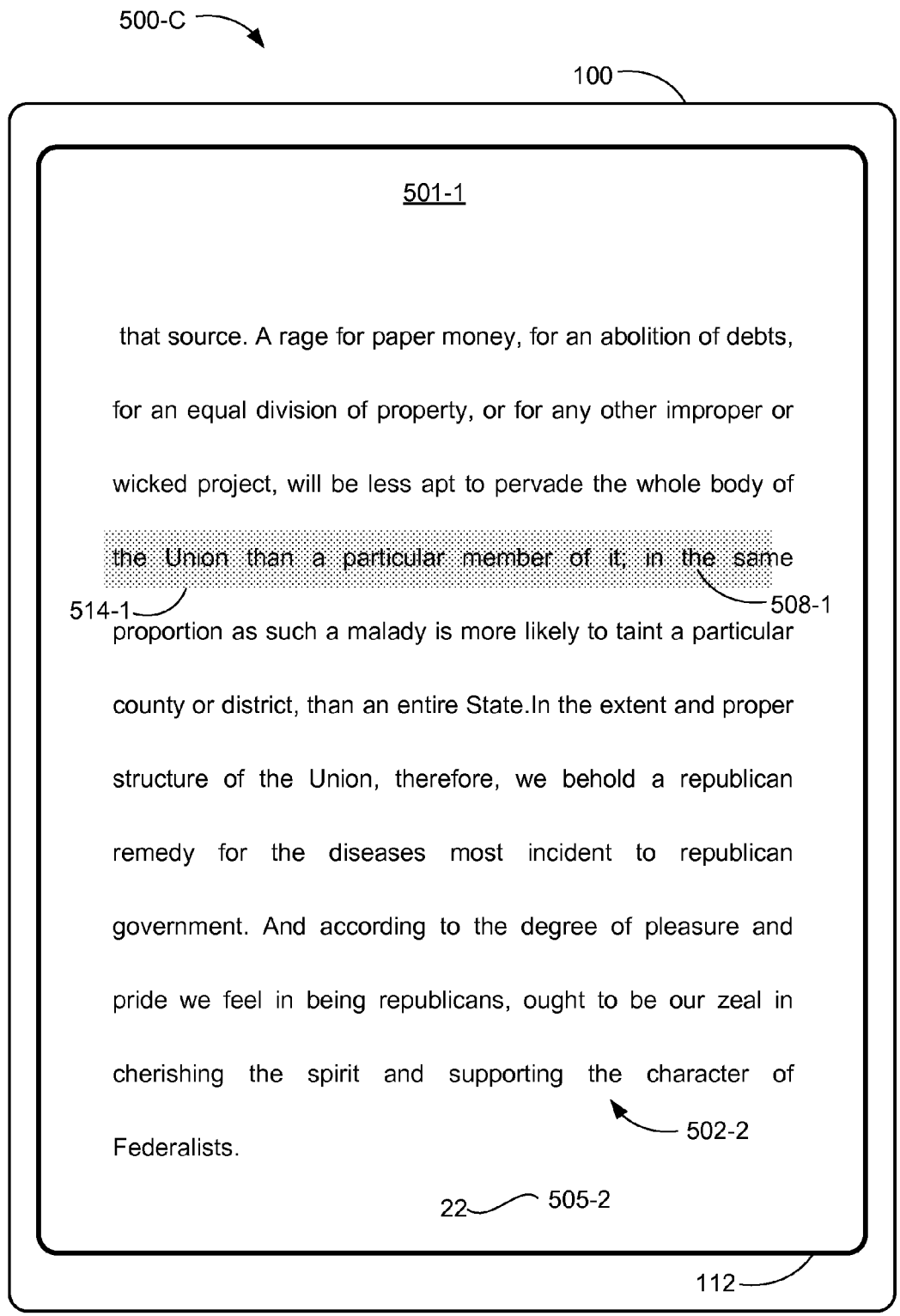

FIG. 5C illustrates UI 500-C, which includes a page 22 of electronic document 501-1 with text portion 508-1 highlighted with highlighting 514-1. In response to detection of gesture 510 (FIG. 5B) over text portion 508-1, text portion 508-1 is highlighted. Highlighting 514 is a form of annotation analogous to highlighting content on a printed document with a highlighter pen, and is not merely a transient highlighting for selection purposes as in text selection for copying and pasting. In some embodiments, the color, type, and/or style of highlighting 514 may be selected by the user, or default to a predefined default color/type/style or to the last user-selected color/type/style if the user does not affirmatively select a color/type/style.

Figure 5D:
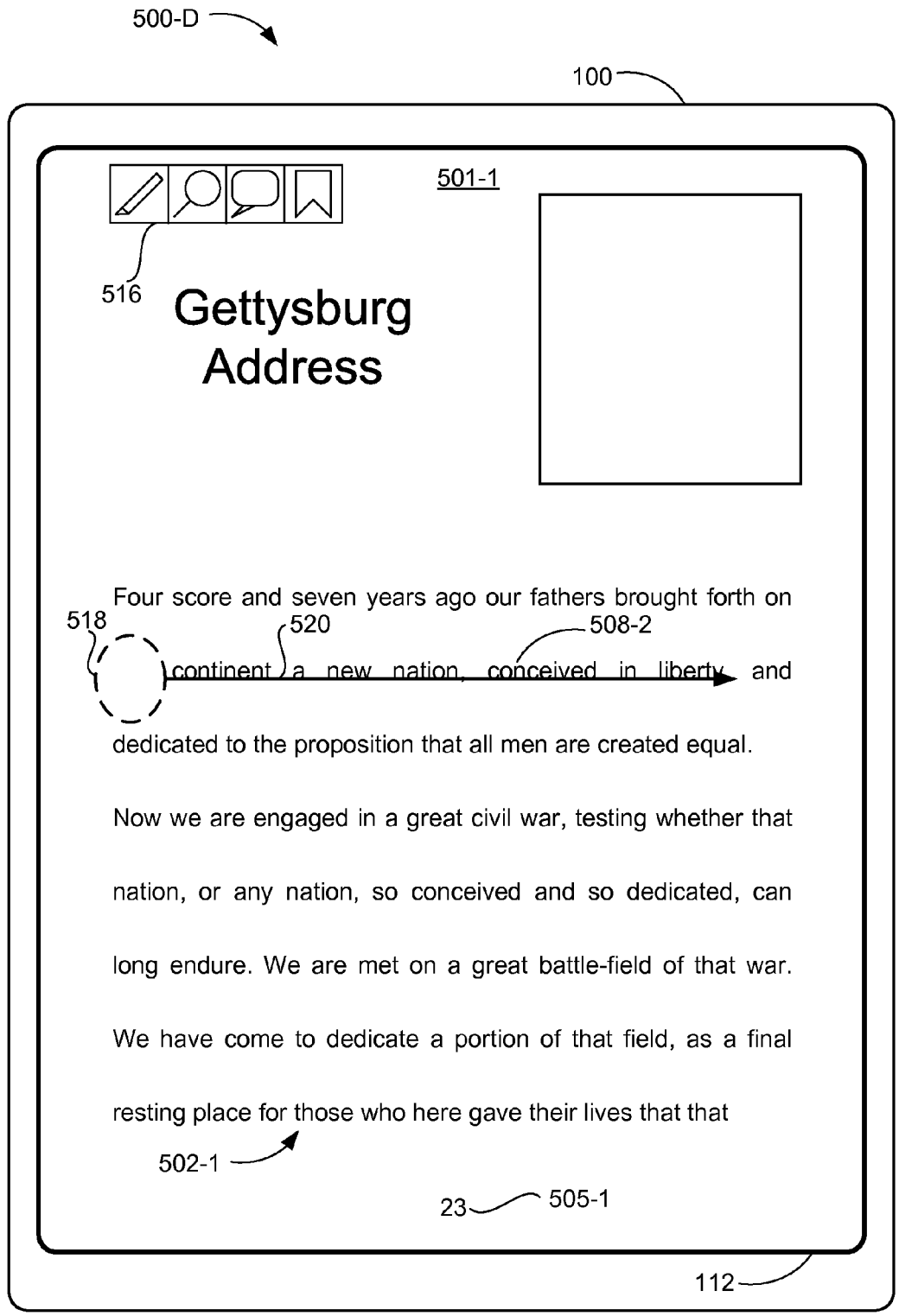

FIG. 5D illustrates UI 500-D. UI 500-D includes a page 23 of electronic document 501-1, displayed on touch-sensitive display 112 in annotation mode. In some embodiments, annotation toolbar 516 is displayed on display 112 when the device is in annotation mode. Annotation toolbar 516 is not displayed when page 23 is displayed in navigation mode (FIGS. 5A-5C). Annotation toolbar 516 includes buttons corresponding to annotation features (e.g., highlighting, commenting, bookmarking). User selection of a button in annotation toolbar 516 (e.g., by a tap gesture on a respective button) activates the corresponding feature.

Gesture 518 by the user is detected on touch-sensitive display 112 over text portion 508-2. Gesture 518 includes movement in direction 520. Gesture 518 is the same type of gesture as gesture 506 (FIG. 5A). In some embodiments, gesture 518 is a swipe or drag gesture.

Figure 5E:
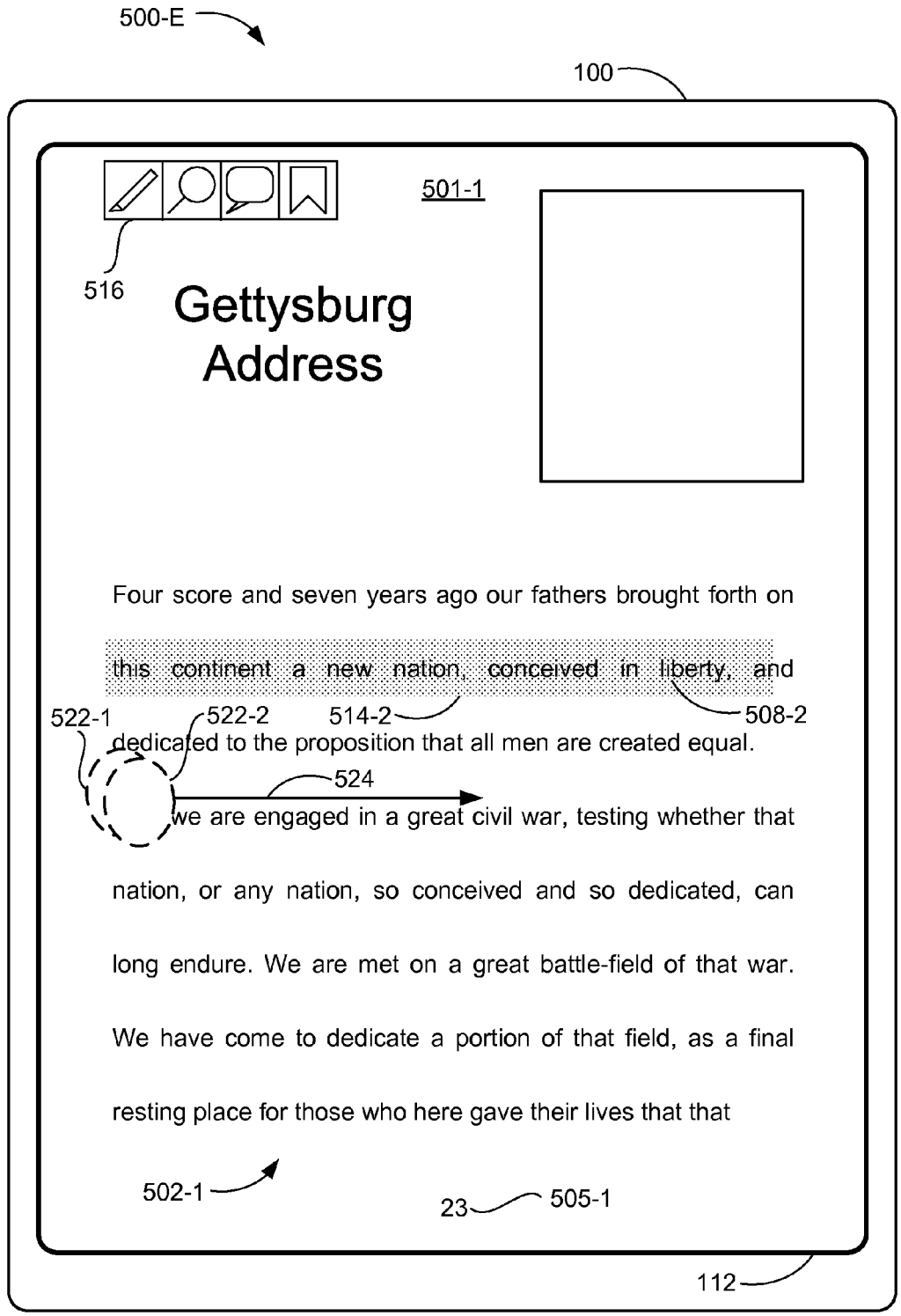

FIG. 5E illustrates UI 500-E, which includes page 23 of electronic document 501-1 with text portion 508-2 highlighted with highlighting 514-2. In response to detection of gesture 518 (FIG. 5D) over text portion 508-2, text portion 508-2 is highlighted. Annotation toolbar 516 remains displayed because the device remains in annotation mode.

In FIG. 5E, gesture 522 by the user is detected on touch-sensitive display 112. Gesture 522 includes movement in direction 524. Gesture 522 is the same type of gesture as gesture 510 (FIG. 5B). In some embodiments, gesture 522 is a tap plus swipe (or drag) gesture, where the finger digit taps (522-1) touch-sensitive display 112, then contacts touch-sensitive display again and swipes (522-2) (or drags) across display 112 in direction 524.

Figure 5F:
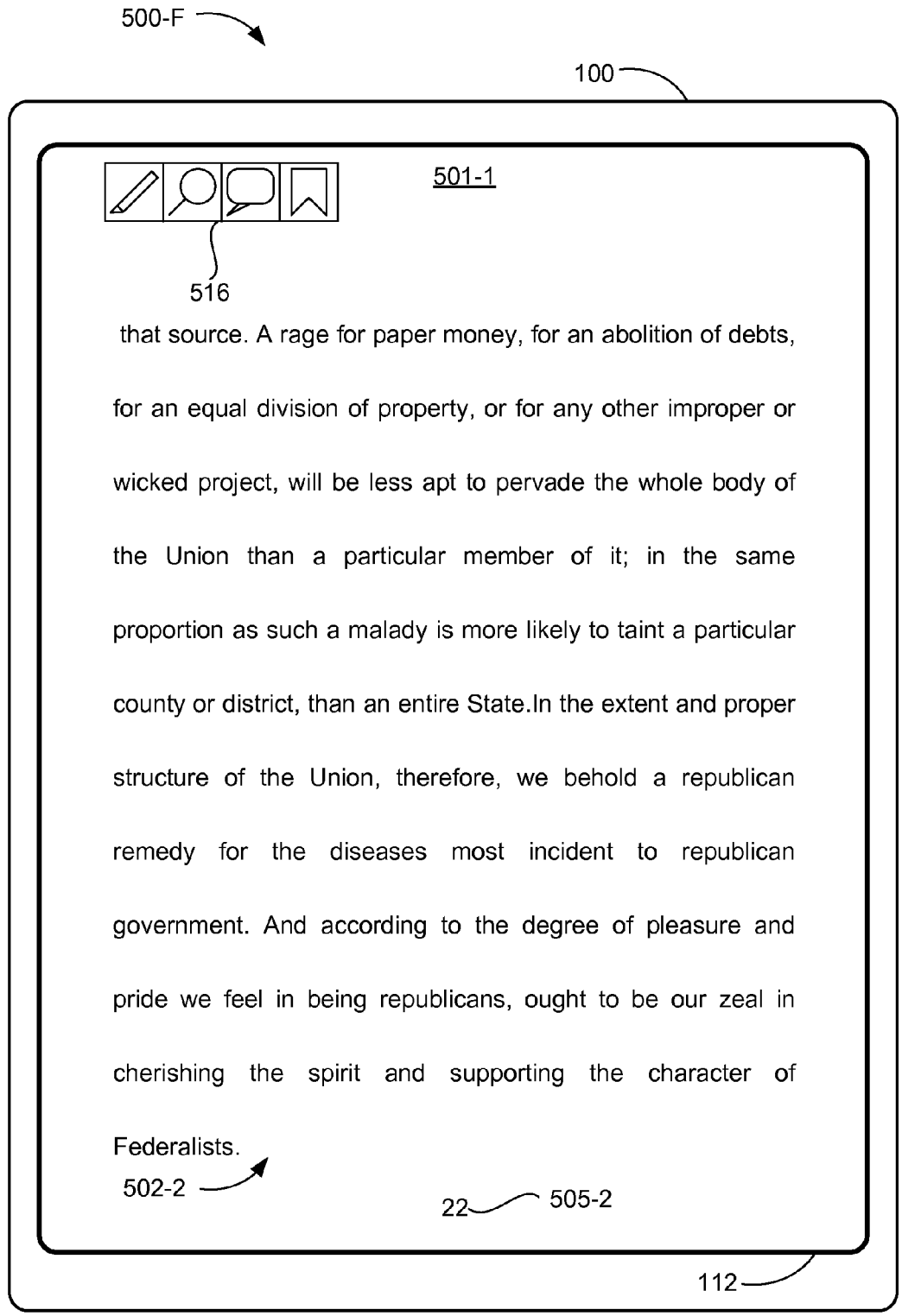

FIG. 5F illustrates UI 500-F, which displays page 22 of electronic document 501-1 on display 112 in annotation mode, as indicated by annotation toolbar 516 remaining displayed. In response to detection of gesture 522 (FIG. 5E), device 100 replaces page 23 (FIG. 5E) with page 22 of electronic document 501-1; device 100 navigates to a different page within electronic document 501-1.

Figure 5G:
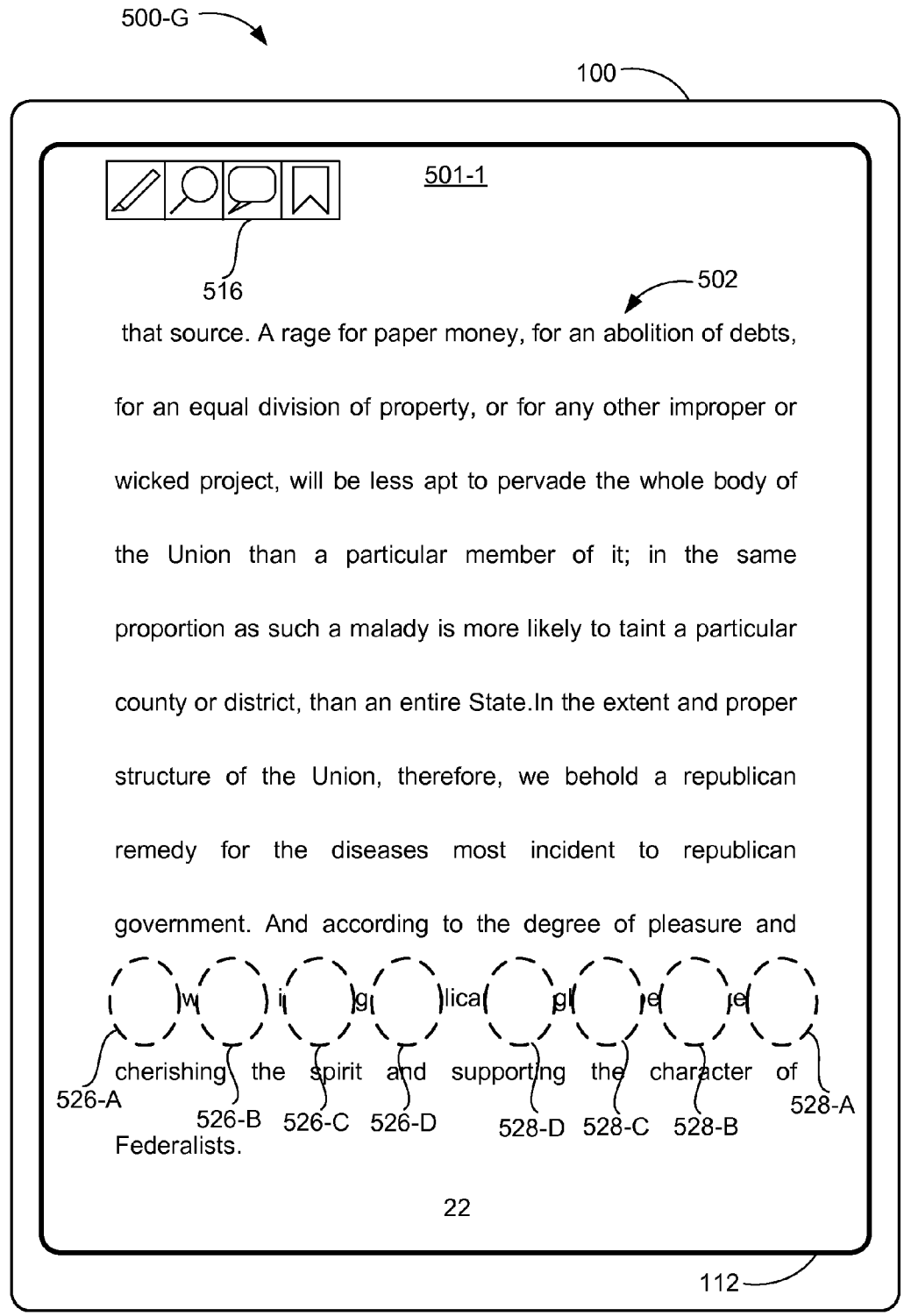

In some embodiments, when displaying electronic document 501, device 100 toggles between navigation mode and annotation mode in response to the detection of a predefined gesture (e.g., gestures 526 and/or 528 or some other predefined gesture). FIG. 5G illustrates UI 500-G, which includes page 22 of electronic document 501-1 displayed on display 112. Annotation toolbar 516 is also displayed, indicating that electronic document 501-1 is being displayed in annotation mode.

Gestures 526 and/or 528 by the user are detected on touch-sensitive display 112. In some embodiments, both gestures 526 and 528 are drumming gestures, each using a respective hand (e.g., gesture 526 is performed using the left hand and gesture 528 the right hand). For example, gesture 526 includes finger contacts 526-A thru 526-D detected in sequence, and gesture 528 includes finger digit contacts 528-A thru 528-D detected in sequence. In gesture 526, contact 526-A (corresponding to the left pinky) is detected first, then contact 526-B (corresponding to the left ring finger), then contact 526-C (corresponding to the left middle finger), and then contact 526-D (corresponding to the left index finger). The sequence of detected contacts is analogous for gesture 528 using the right hand. In some embodiments, gesture 526 and/or 528 correspond to a predefined gesture for toggling between annotation mode and navigation mode, as described above; depending on the embodiment, the predefined gesture includes a drumming gesture using one hand (as in either gesture 526 or 528) or both hands (as in both gesture 526 and 528 detected simultaneously or within a predefined time period of each other (e.g., less than 0.5 second apart).

Figure 5H:
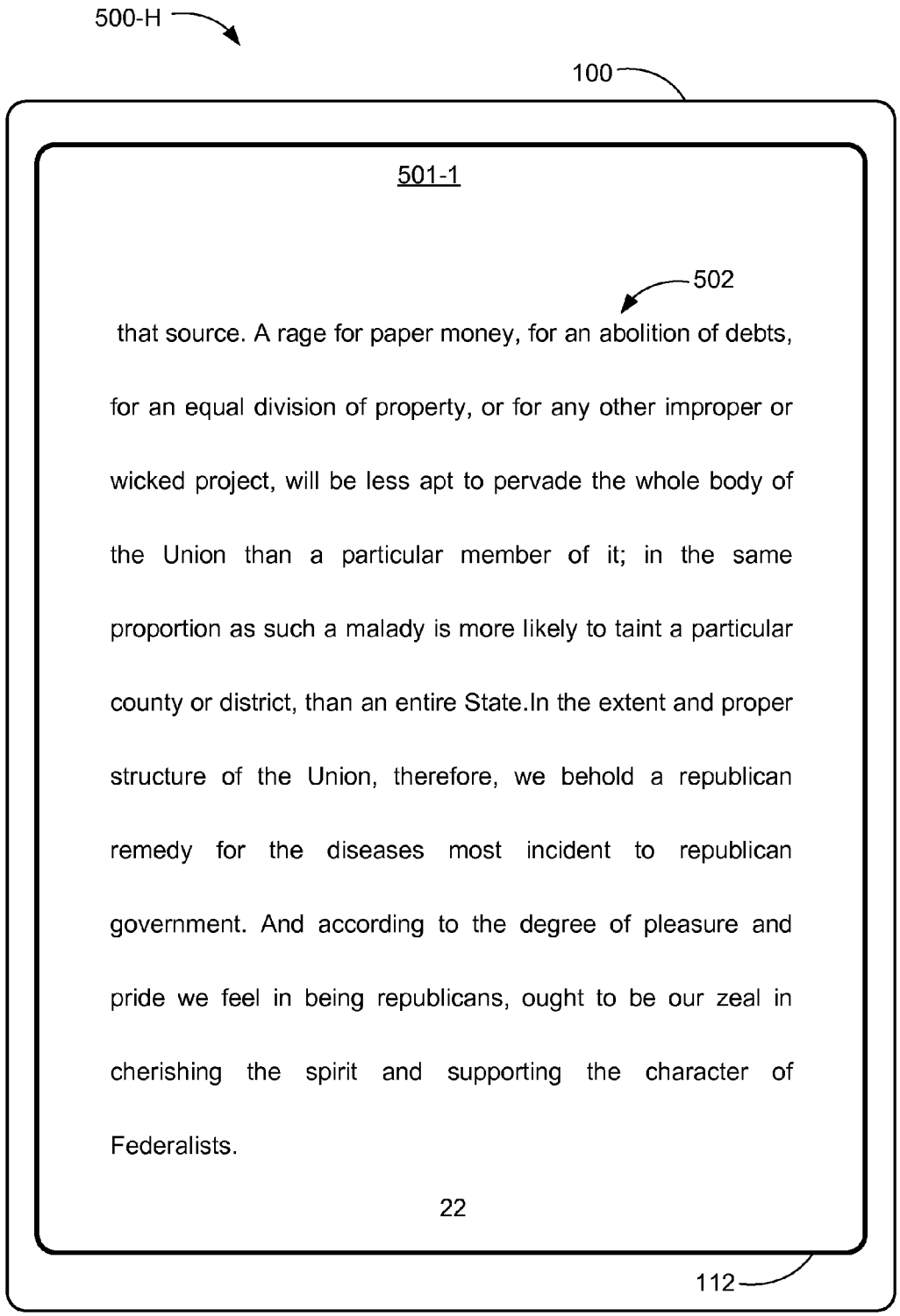

In response to detection of gesture 526 and/or 528, device 100 switches to navigation mode, as shown in FIG. 5H. FIG. 5H illustrates UI 500-H, which includes electronic document 501-1, with body text 502 displayed on display 112 in navigation mode, as indicated by the absence of annotation toolbar 516.

While electronic document 501 is displayed in navigation mode, as shown in FIG. 5H, the user may perform a drumming gesture(s) analogous to gestures 526 and/or 528 to switch back to annotation mode. When switched back to annotation mode, annotation toolbar 516 is displayed.

Figure 5I:
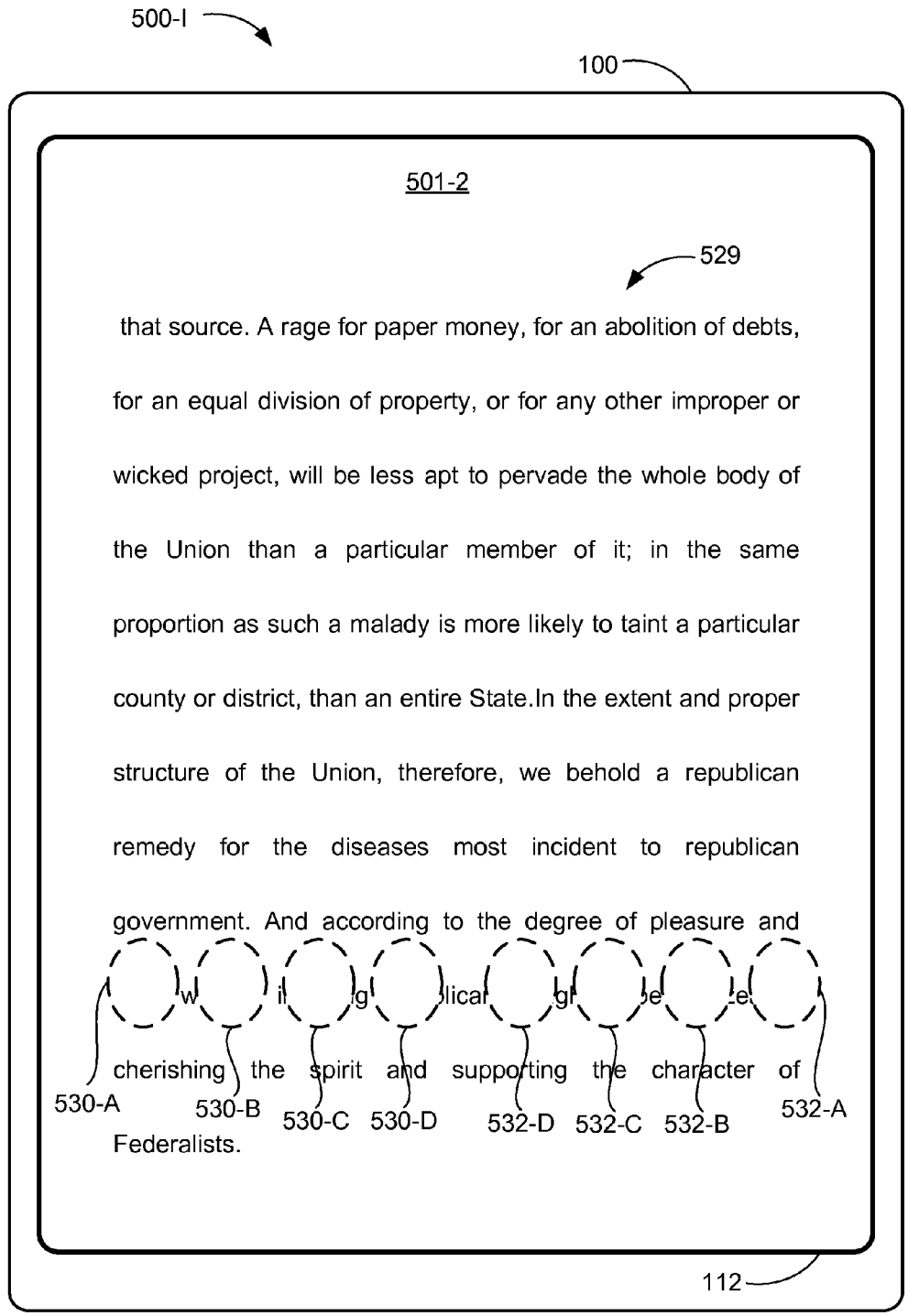

FIG. 5I illustrates UI 500-I. UI 500-I includes a page of electronic document 501-2 displayed on touch-sensitive display 112 of device 100 that includes touch-sensitive display 112 and a touch-sensitive surface distinct from touch-sensitive display 112 (e.g., a touch-sensitive surface on the back or sides of device 100). The electronic document includes content (e.g., body text 529, analogous to body text 502).

Gestures 530 and/or 532 by the user are detected on touch-sensitive display 112. In some embodiments, gestures 530 and 532 are drumming gestures. Gestures 530 and 532 are analogous to gestures 526 and 528, respectively, and thus further details are omitted here.

Figure 5J:
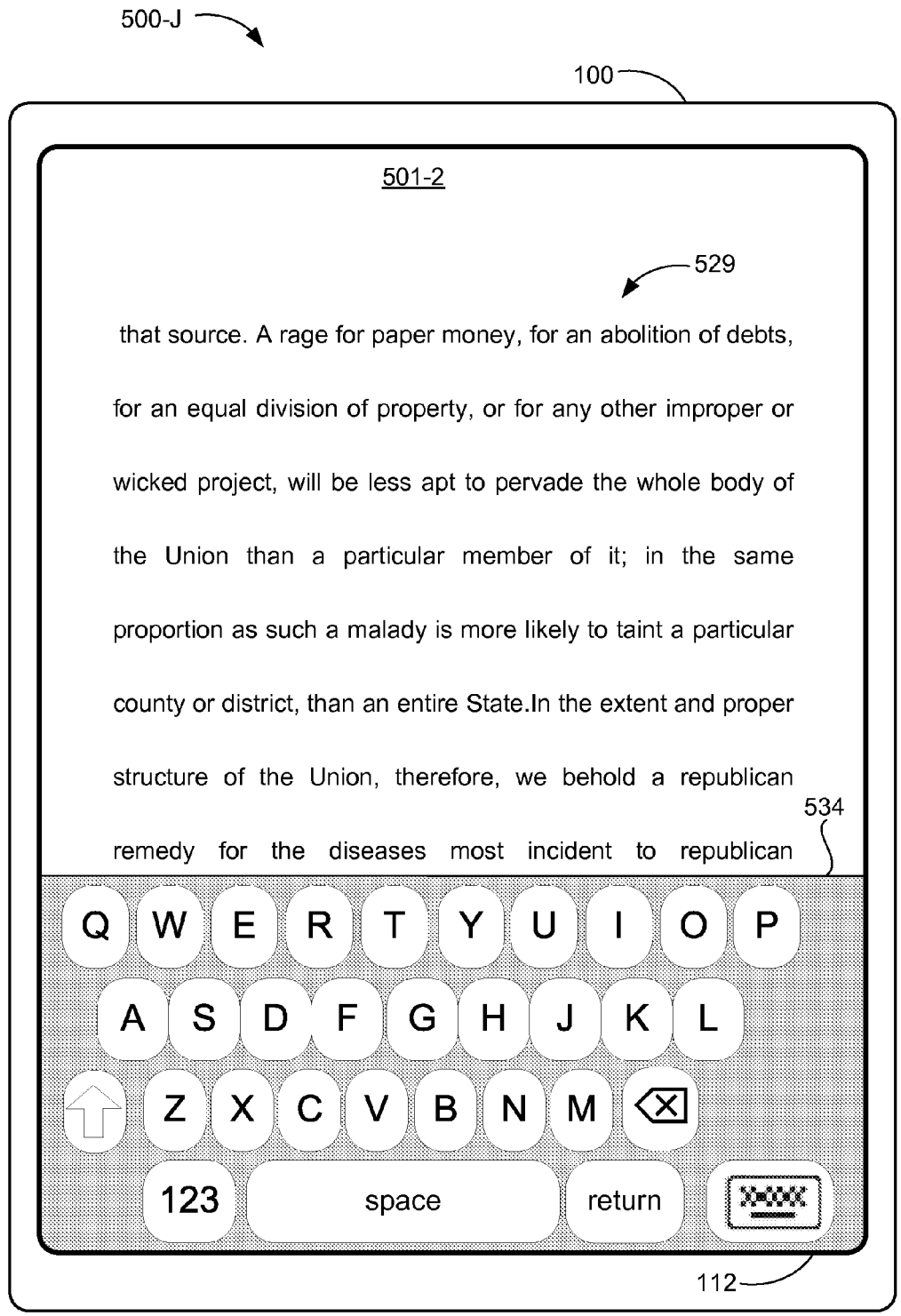

In response to detection of gestures 530 and/or 532 (depending on the embodiment, one or both hands performing the drumming gesture is needed), soft keyboard 534 is displayed on display 112, as shown in FIG. 5J. FIG. 5J illustrates UI 500-J, which includes soft keyboard 534 displayed over a portion of electronic document 501-2. Soft keyboard 534 is an unsplit soft keyboard (i.e., the keyboard keys are not distributed amongst two non-adjacent, non-contiguous portions). The user may use soft keyboard 534 to annotate (e.g., input notes or comments) electronic document 501-2.

In some embodiments, the touch-sensitive surface distinct from touch-sensitive display 112 is on the side of the device opposite of touch-sensitive display 112 (e.g., touch-sensitive display 112 is on the front side and the distinct touch-sensitive surface is on the back side). Examples of touch-sensitive surfaces distinct from the touch-sensitive display are disclosed in U.S. patent application Ser. No. 12/849,769, titled "Device, Method, and Graphical User Interface with Enhanced Touch Targeting," filed Aug. 3, 2010, which is incorporated by reference herein in its entirety.

Figure 5K:
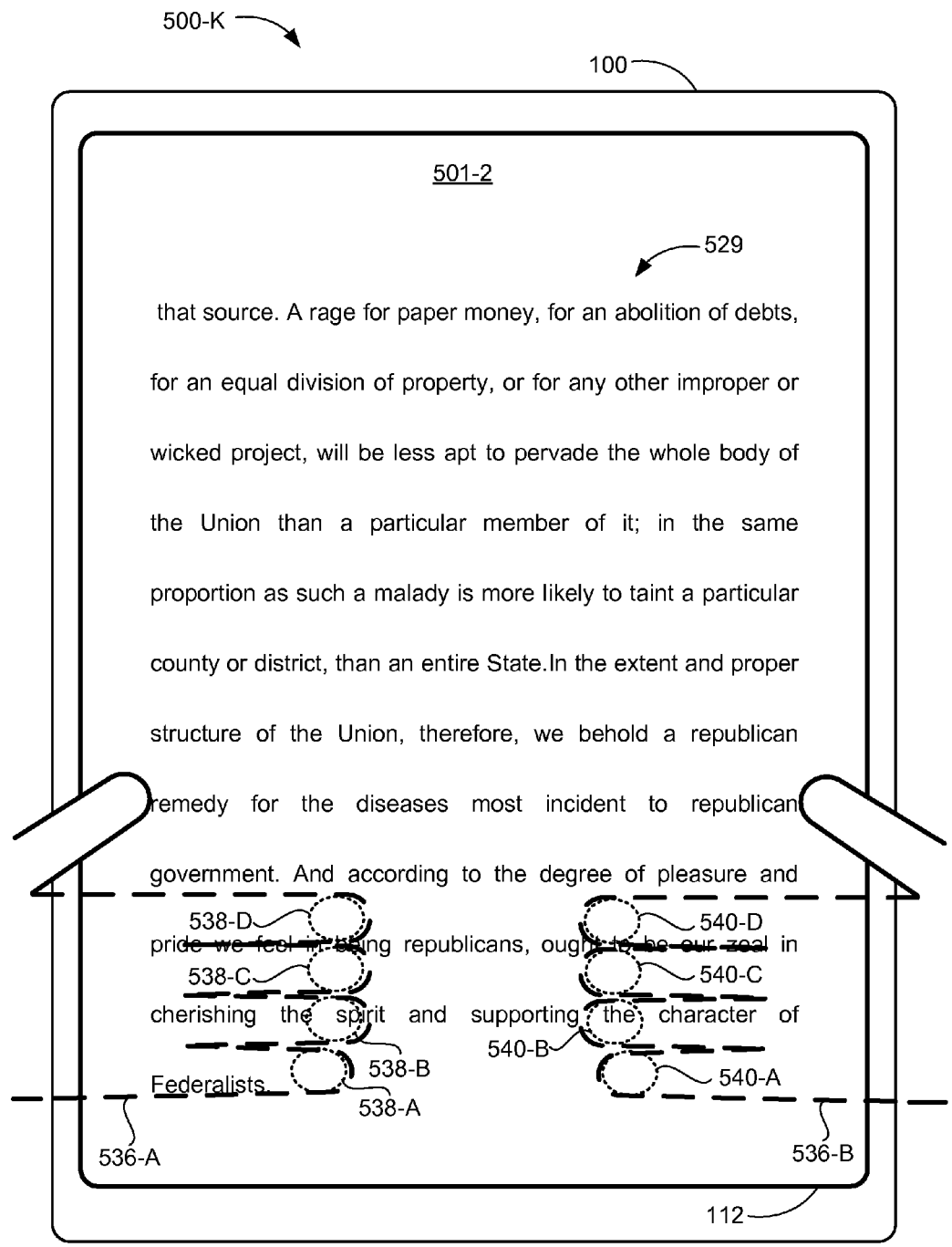

FIG. 5K illustrates UI 500-K, which includes electronic document 501-2, with body text 529, displayed on touch-sensitive display 112 of device 100 that includes a touch-sensitive surface on the back side, opposite the front side that has display 112. Left hand 536-A and right hand 536-B are holding device 100, with the thumbs on the front side and the non-thumb finger digits on the back side (as indicated by the dotted lines indicating the finger digits).

Gestures 538 and 540 are detected on the touch-sensitive surface on the back side of device 100. In some embodiments, gestures 538 and 540 are each drumming gestures. For example, gesture 538 includes finger contacts 538-A thru 538-D detected in sequence, and gesture 540 includes finger digit contacts 540-A thru 540-D detected in sequence. In gesture 538, contact 538-A (corresponding to the left pinky) is detected first, then contact 538-B (corresponding to the left ring finger), then contact 538-C (corresponding to the left middle finger), and then contact 538-D (corresponding to the left index finger). The sequence of detected contacts is analogous for gesture 540 using the right hand.

Figure 5L:
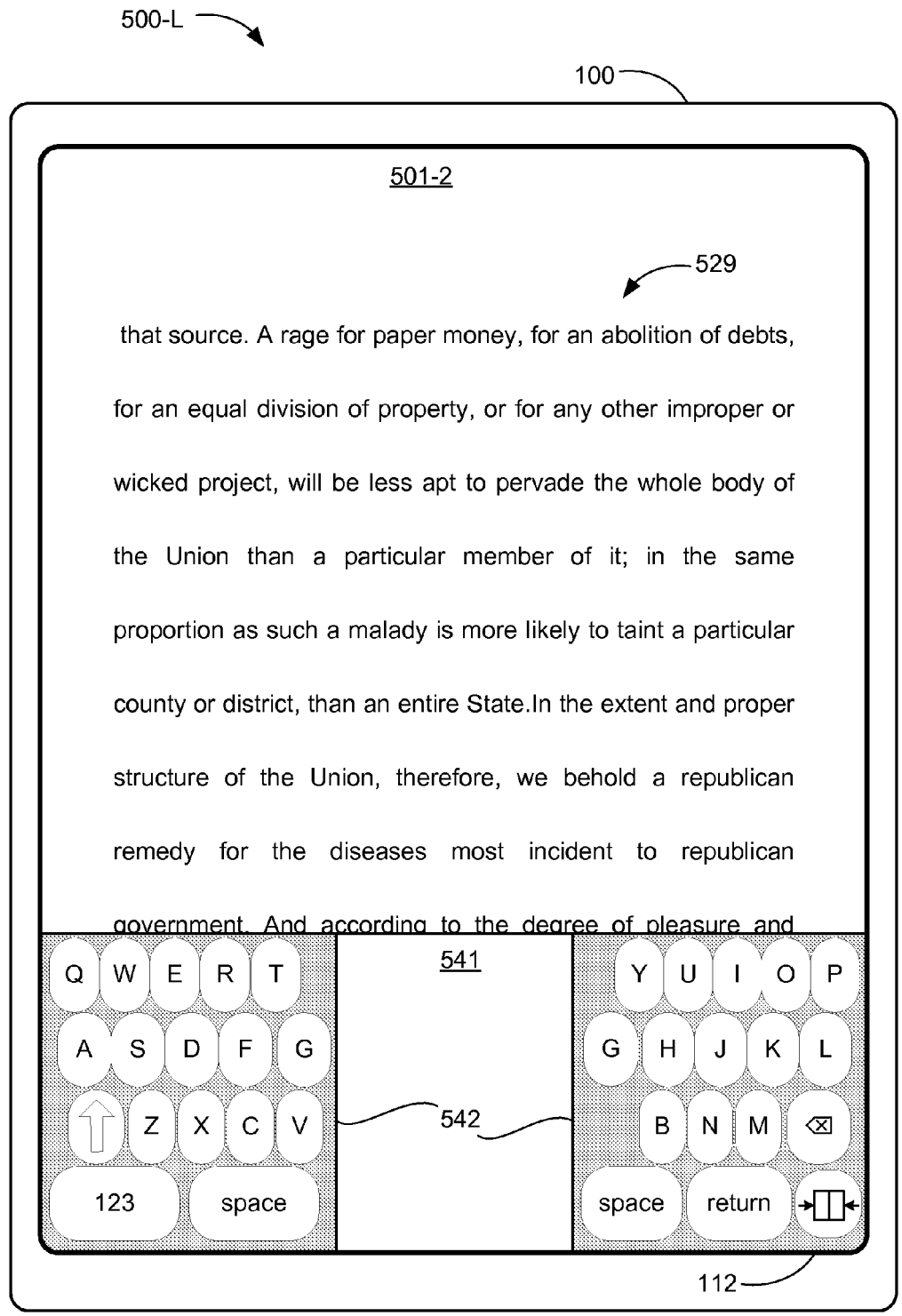

In response to detection of gestures 538 and/or 540 (depending on the embodiment, one or both hands performing the drumming gesture is needed), integrated input area 541 with split soft keyboard 542 is displayed on display 112, as shown in FIG. 5L. FIG. 5L illustrates UI 500-L, which includes split soft keyboard 542 displayed over a portion of electronic document 501-2. In some embodiments, split soft keyboard 542 is part of an integrated input area 541 displayed on display 112. Examples of integrated input areas including split soft keyboards are disclosed in U.S. Provisional Patent Application No. 61/410,862, entitled "Device, Method, and Graphical User Interface for Manipulating Soft Keyboards," filed Nov. 5, 2010, which is incorporated by reference in its entirety. The user may use split soft keyboard 542 to annotate (e.g., input notes or comments) electronic document 501-2. Thus, a different soft keyboard is displayed depending on where a predefined gesture associated with activating display of the keyboard is detected. The location of the gesture detection serves as a signal to the likely positioning of the user's hands with respect to typing, and the appropriate keyboard is displayed in response.

Figure 5M:
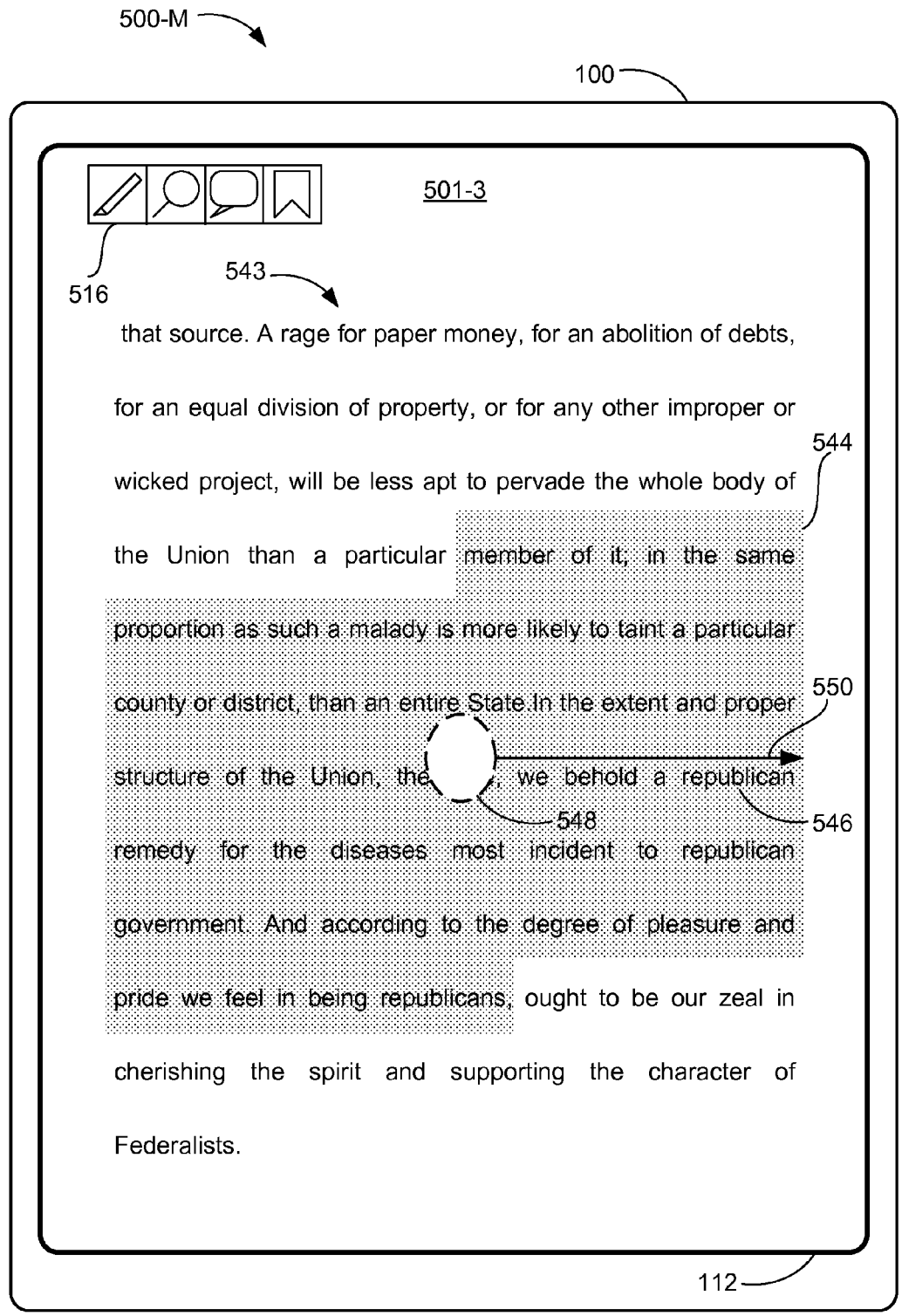

FIG. 5M illustrates UI 500-M, which includes electronic document 501-3 displayed on touch-sensitive display 112 of device 100. Electronic document 501-3 includes body text 543 and highlighting 544 (similar to highlighting 514, FIGS. 5C and 5E) over a portion of body text 543. Highlighting 544 may be of a particular type (e.g., a particular color, a particular style (e.g., underline, colored highlighting analogous to using a highlighter pen on paper). Highlighting 544 is user-specified (e.g., in accordance with the examples illustrated in FIGS. 5A-5F).

Gesture 548 by the user, over text segment 546, is detected on touch-sensitive display 112. Text segment 546 is within the portion of body text 543 that is highlighted by highlighting 544. Gesture 548 includes movement in direction 550 and is initiated at a location on display 112 corresponding to a location within highlighting 544. In some embodiments, gesture 548 is a swipe gesture.

Figure 5N:
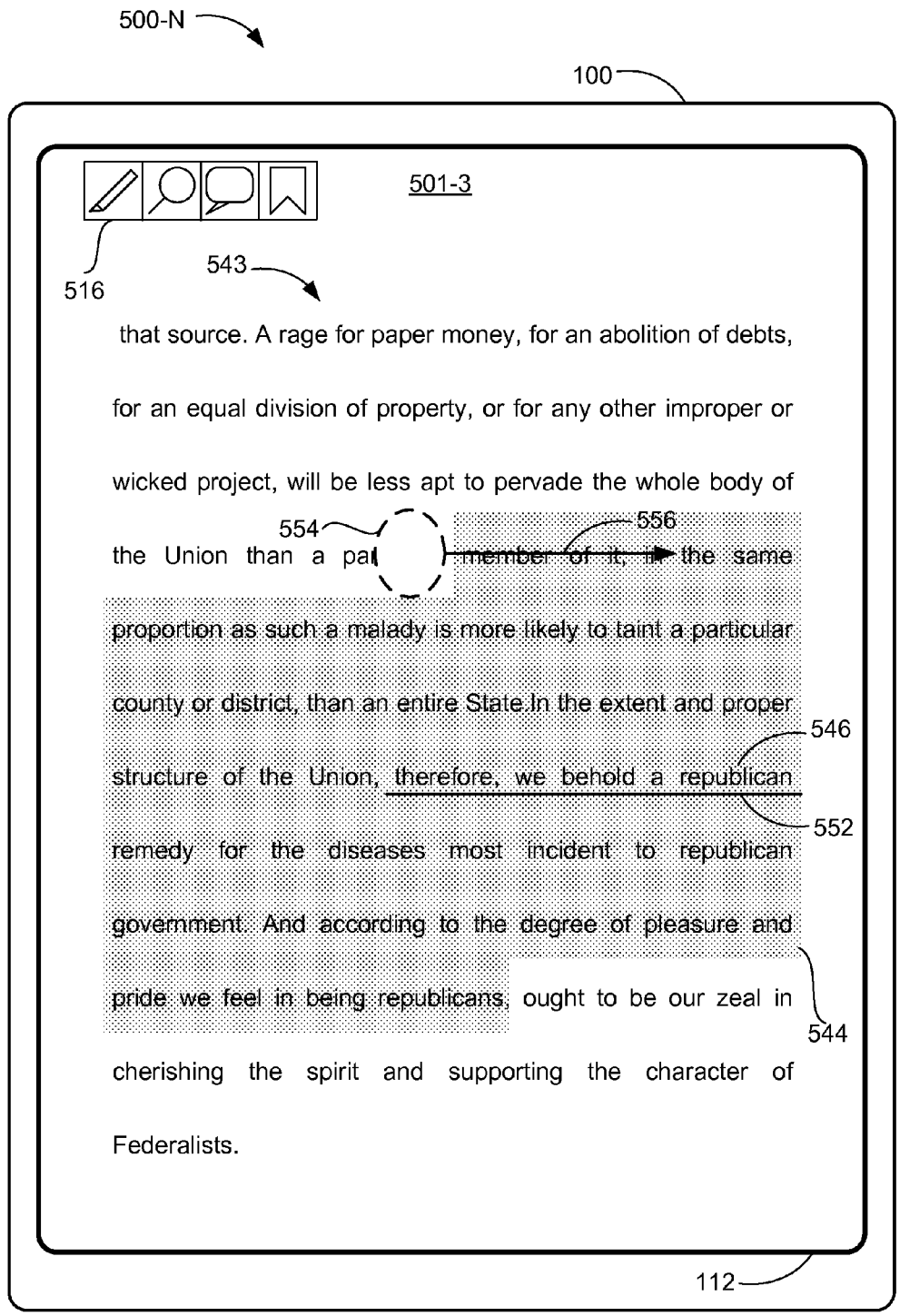

FIG. 5N illustrates UI 500-N, which includes electronic document 501-3 with a portion of body text 544 highlighted with highlighting 544. In response to detection of gesture 548 (FIG. 5M) over text segment 546, text segment 546 is highlighted with underlining 552. In some embodiments, instead of underling 552, text segment 546 is highlighted with highlighting of a different color than highlighting 544. For example, text segment 546 if highlighting 544 is yellow, then text segment 546 is highlighted with a non-yellow color (e.g., green), while the rest of highlighting 544 remains yellow.

In FIG. 5N, gesture 554 by the user is detected on touch-sensitive display 112. Gesture 554 includes movement in direction 556 toward highlighting 544. Gesture 554 is initiated at a location on display 112 corresponding to a location on the topmost line of text that is at least partially highlighted by highlighting 544 (the line "the Union than a particular member of it; in the same") and in proximity (e.g., within 10 pixels or 1 cm) of the edge of highlighting 544 for that line of text. In some embodiments, gesture 554 is a swipe or drag gesture.

Figure 5O:
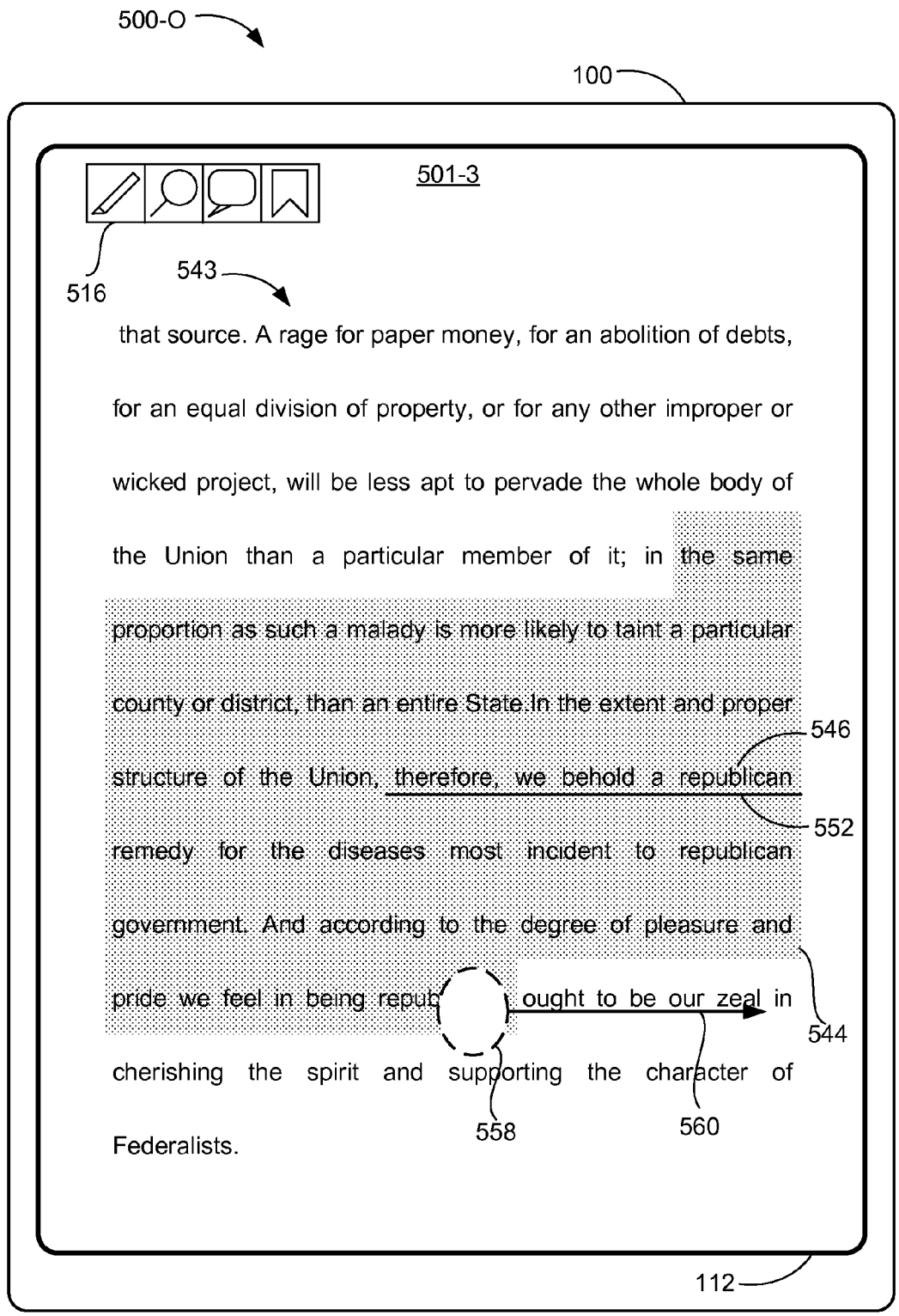

FIG. 5O illustrates UI 500-O, which includes electronic document 501-3, with text 543, displayed. In response to detection of gesture 554 (FIG. 5N) in proximity of the edge of highlighting 544, highlighting 544 over "members of it, in the same" in the line "the Union than a particular member of it; in the same" is contracted to highlight "the same," instead of adding highlighting of the second type. Underlining 552 highlighting text portion 546 remains displayed.

In FIG. 5O, gesture 558 by the user is detected on touch-sensitive display 112. Gesture 558 includes movement in direction 560 away from highlighting 544. Gesture 558 is initiated at a location on display 112 corresponding to a location on the bottom-most line of text that is at least partially highlighted by highlighting 544 (the line "pride we feel in being republicans, ought to be our zeal in") and in proximity (e.g., within 10 pixels or 1 cm) of the edge of highlighting 544 for that line of text. In some embodiments, gesture 558 is a swipe or drag gesture.

Figure 5P:
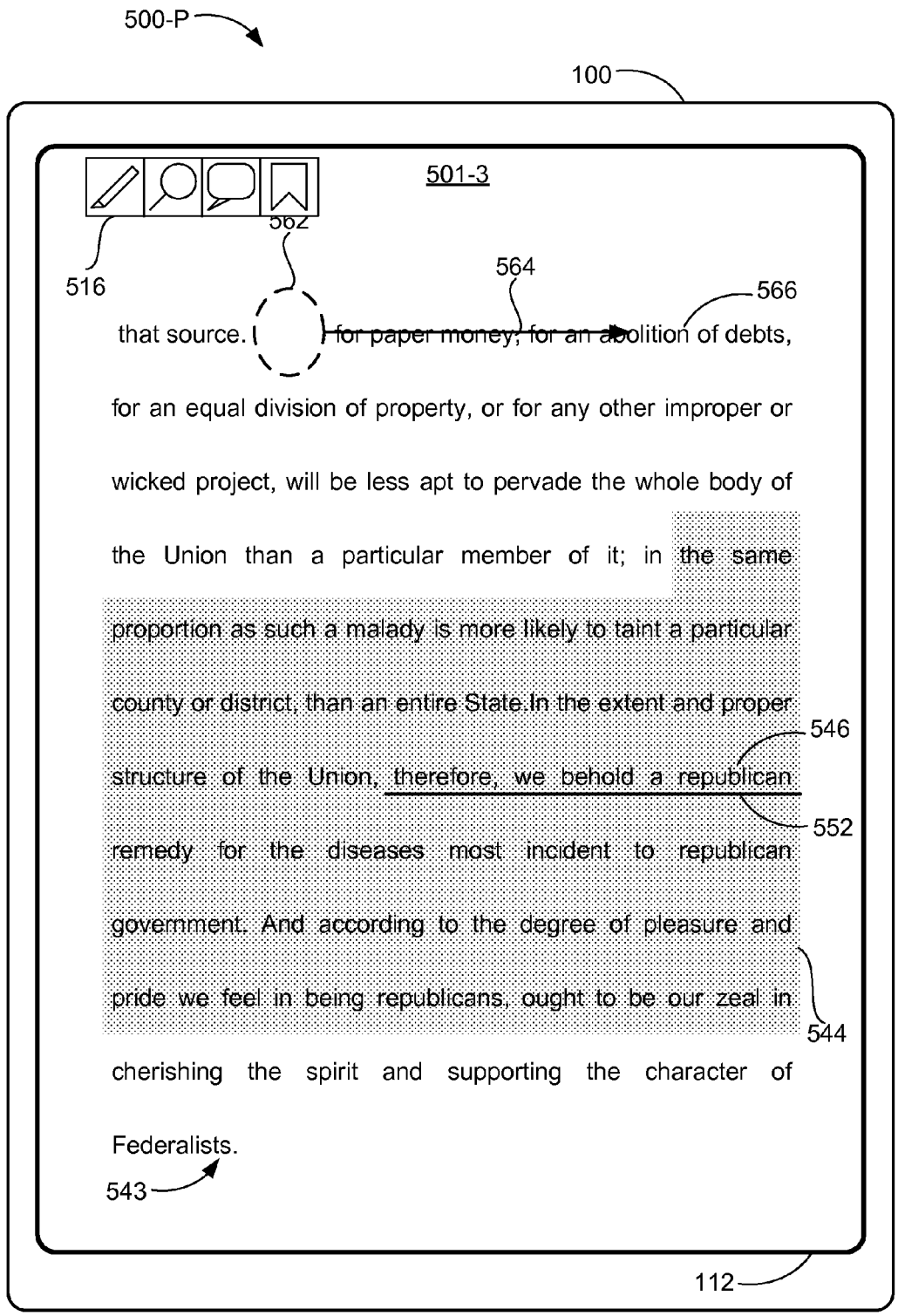
Figure 5Q:
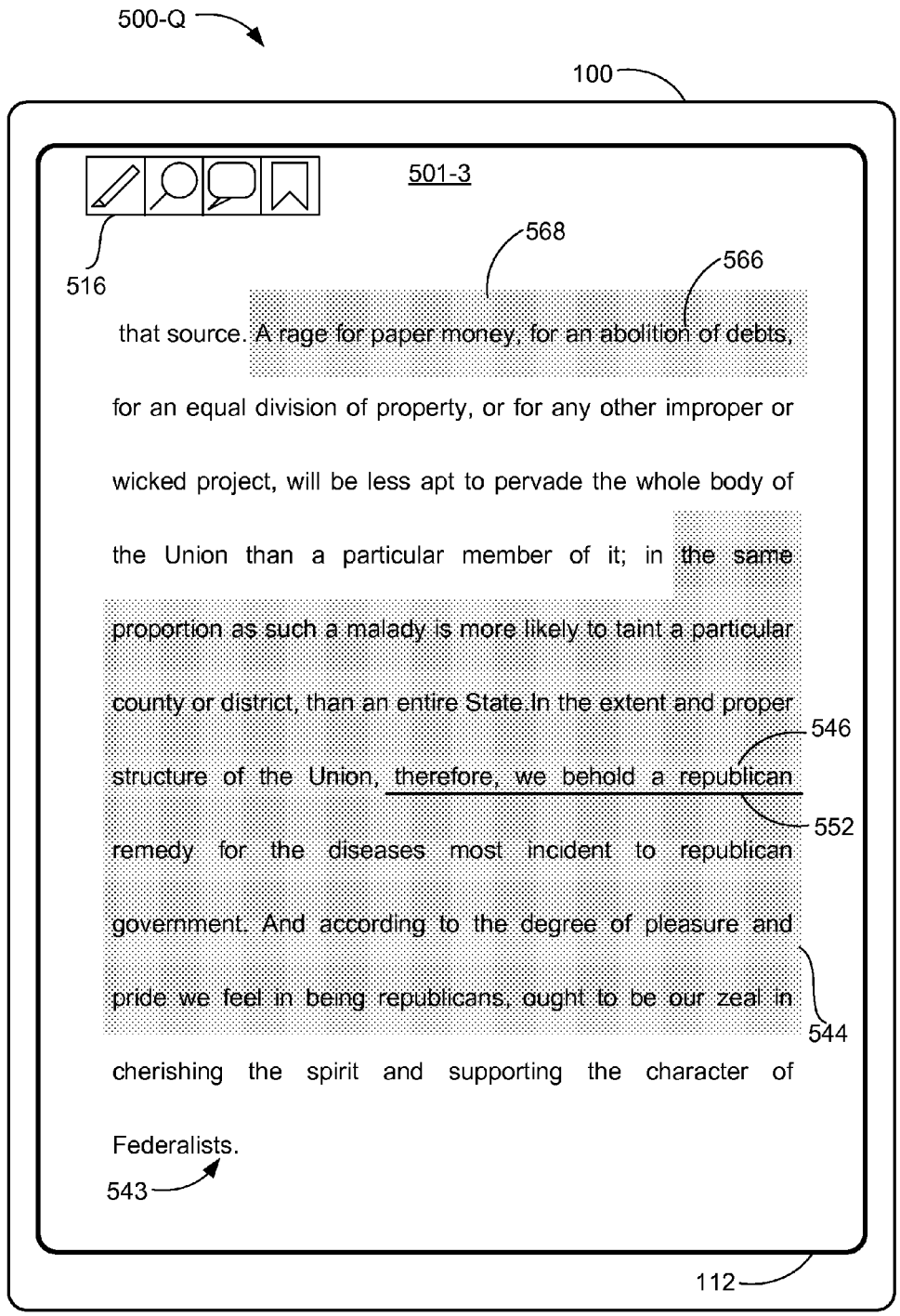

FIG. 5P illustrates UI 500-P, which includes electronic document 501-3, with text 543, displayed. In response to detection of gesture 558 (FIG. 5O) in proximity of the edge of highlighting 544, highlighting 544 over "pride we feel in being republicans" in the line "pride we feel in being republicans, ought to be our zeal in" is expanded to highlight "pride we feel in being republicans, ought to be our zeal in," instead of adding highlighting of the second type. Underlining 552 highlighting text portion 546 remains displayed.

In FIG. 5P, gesture 562 by the user is detected on touch-sensitive display 112. Gesture 562 includes movement in direction 564 and is initiated at a location on display 112 corresponding to a location on text 543 that does not include any highlighting. Gesture 562 moves over text portion 566. In some embodiments, gesture 562 is a swipe or drag gesture.

FIG. 5Q illustrates UI 500-Q, which includes electronic document 501-3, with text 543, displayed. In response to detection of gesture 562 (FIG. 5P), text portion 566 (the text "A rage for paper money, for an abolition of debts,") is highlighted with highlighting 568. In some embodiments, highlighting 568 is of the same type as highlighting 544. For example, if highlighting 544 is yellow color, highlighting 568 is also yellow color. In some other embodiments, highlighting 568 may be of a different type than highlighting 544 (e.g., different color, underlining vs. regular highlighting). In some embodiments, if highlighting 568 extends to the text immediately preceding highlighting 544, so that highlighting 568 and 544 together highlight a contiguous passage of text without intervening un-highlighted text, highlighting 568 and 544 may be merged into one larger area of highlighting.

Figure 6A:
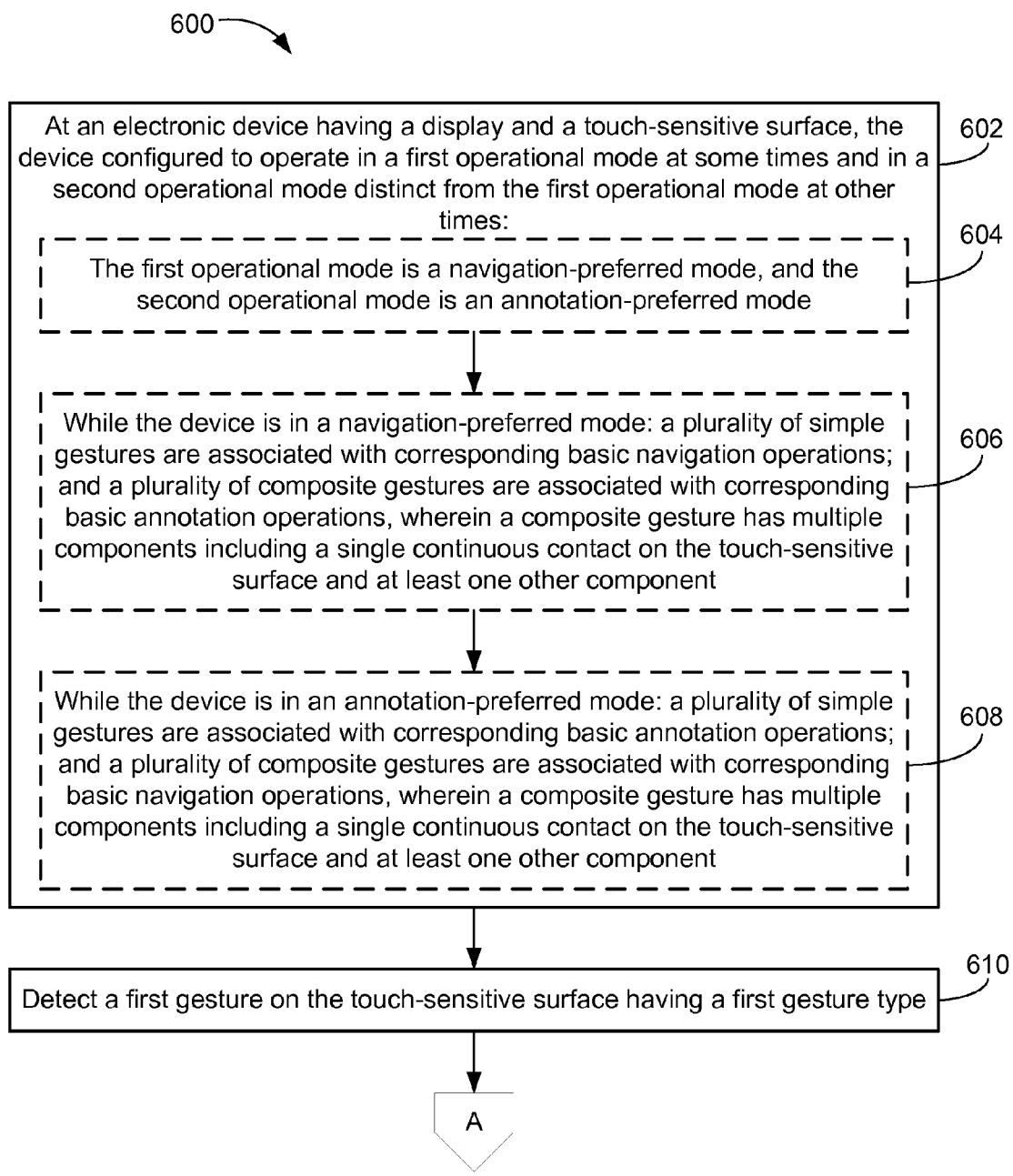
FIGS. 6A-6C are flow diagrams illustrating a method of navigating and annotating an electronic document in accordance with some embodiments.
Figure 6B:
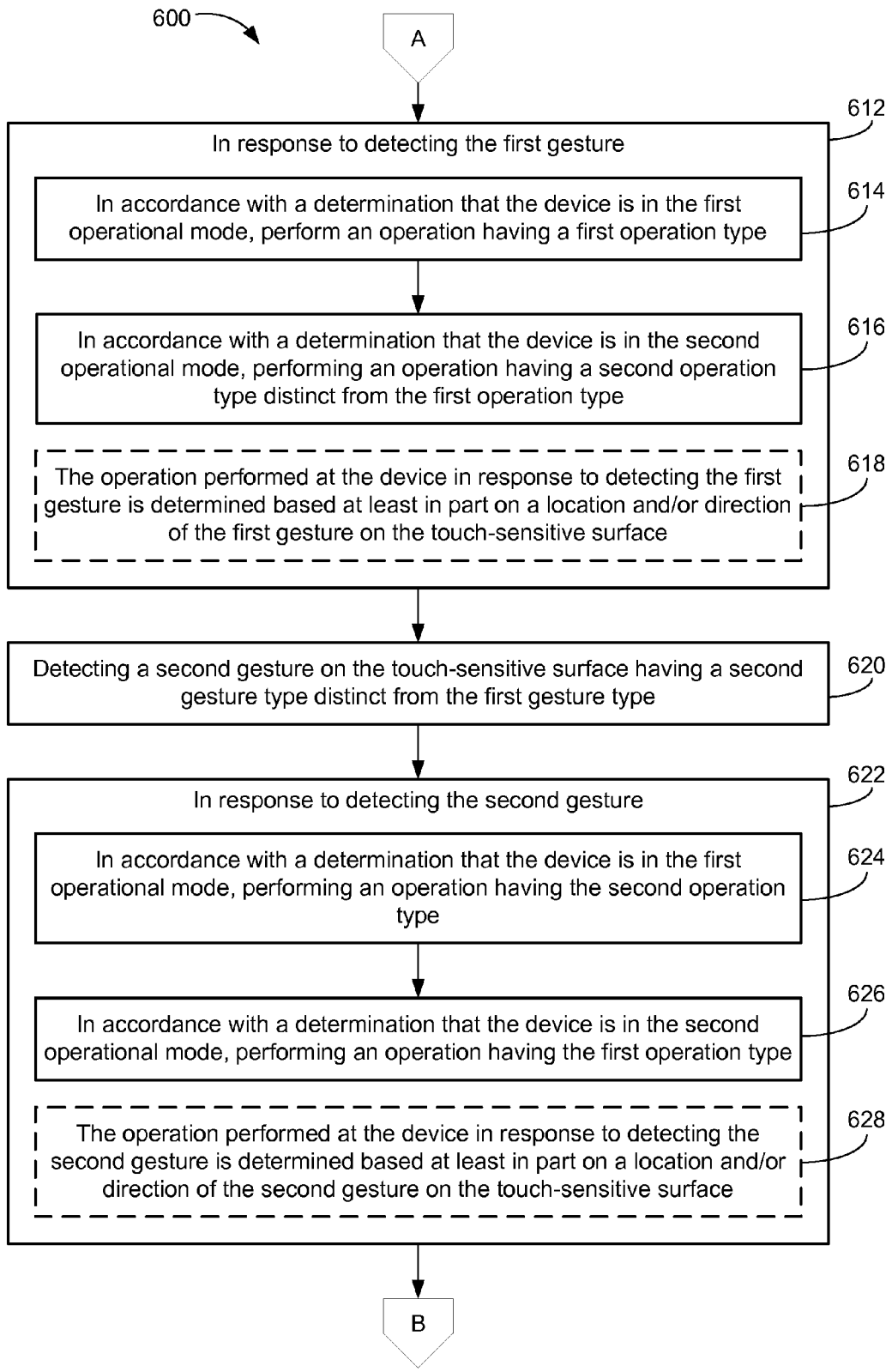
Figure 6C:
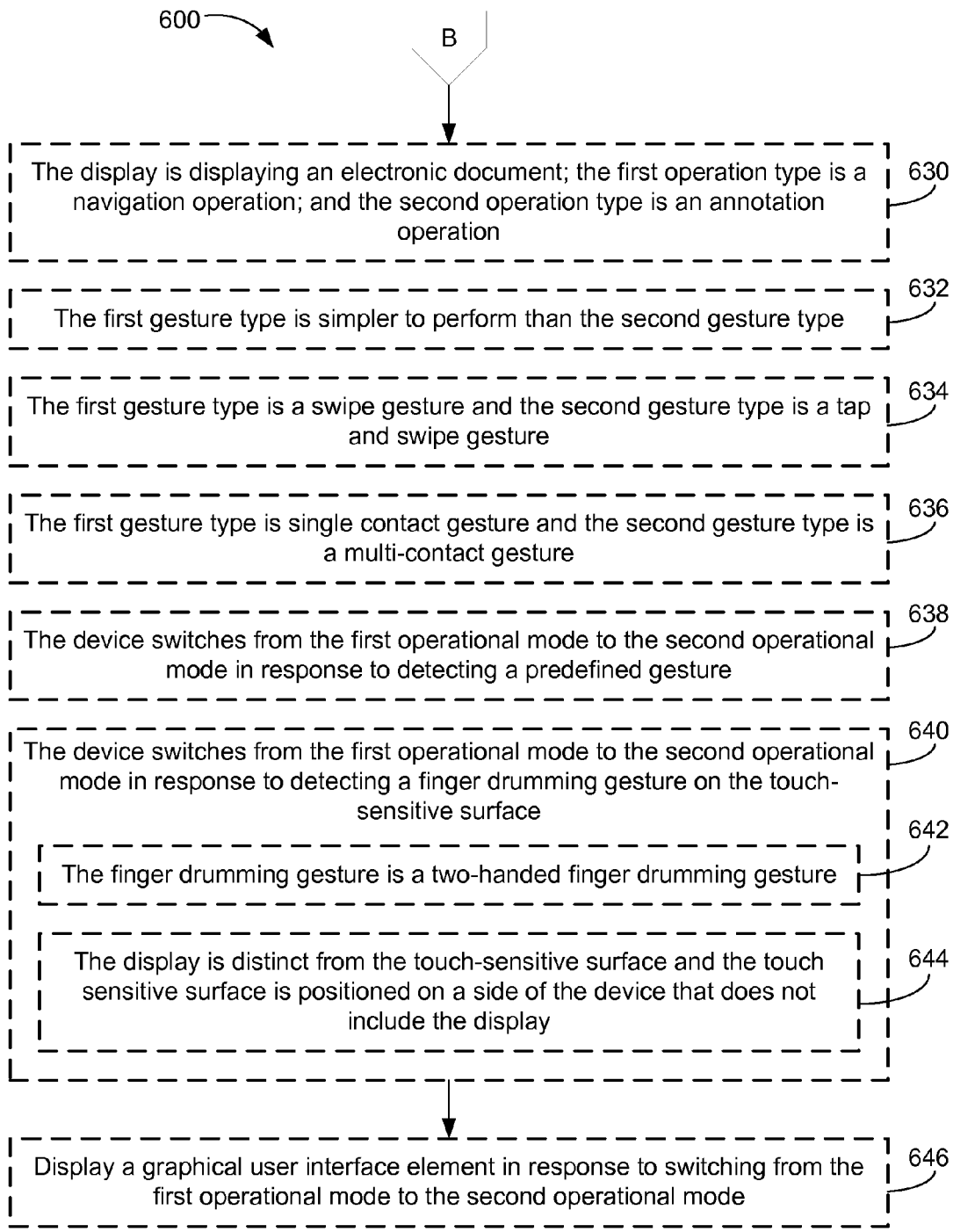

FIGS. 6A-6C are flow diagrams illustrating a method 600 of navigating and annotating an electronic document in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. In some embodiments, the device includes a touch-sensitive display and a touch-sensitive surface distinct from the touch-sensitive display. Some operations in method 600 may be combined and/or the order of some operations may be changed.

As described below, the method 600 provides an intuitive way to navigate and annotate an electronic document. The method simplifies the procedure for navigation when a navigation-focused mode is active, yet still enables annotation in the navigation-focused mode. Conversely, the method simplifies the procedure for annotation when an annotation-focused mode is active, yet still enables navigation in the annotation-focused mode. For battery-operated electronic devices, enabling a user to navigate and annotate an electronic document faster and more efficiently conserves power and increases the time between battery charges.

The method 600 is performed at an electronic device having a display and a touch-sensitive surface, where the device is configured to operate in a first operational mode at some times and in a second operational mode distinct from the first operational mode at other times (602). In other words, during a first time period the device operates in the first operational mode, and during a second time period the device operates in the second operational mode, and the first time period does not overlap with the second time period (e.g., the device switches from a navigation mode to an annotation mode in response to user input). For example, device 100 (FIGS. 5A, 5D, 5G, 5H) may display electronic document 501 in a navigation mode (where the emphasis is on moving through the document, e.g., by turning pages or scrolling) or an annotation mode (where the emphasis is on annotating a displayed page).

In some embodiments, the first operational mode is a navigation-preferred mode; and the second operational mode is an annotation-preferred mode (604). For example, as described above with reference to FIG. 5A, in navigation mode, the focus is on efficient navigation, and in annotation mode, the focus is on efficient annotation.

In some embodiments, while the device is in a navigation-preferred mode, a plurality of simple gestures are associated with corresponding basic navigation operations, and a plurality of composite gestures are associated with corresponding basic annotation operations, where a composite gesture has multiple components including a single continuous contact on the touch-sensitive surface and at least one other component (606). In other words, in navigation-preferred mode, navigation is preferred and can thus be performed using simple gestures, but annotation is possible using more complex gestures. In some embodiments, a simple gesture consists of a single continuous contact on the touch-sensitive surface, such as a drag or swipe gesture. In some embodiments, a composite gesture includes a simple gesture and one or more additional gesture components (e.g., taps, swipes, additional contacts, etc.).

In some embodiments, while the device is in an annotation-preferred mode, a plurality of simple gestures are associated with corresponding basic annotation operations; and a plurality of composite gestures are associated with corresponding basic navigation operations, where a composite gesture has multiple components including a single continuous contact on the touch-sensitive surface and at least one other component (608). In other words, in annotation-preferred mode, annotation is preferred and can thus be performed using simple gestures, but navigation is possible using more complex gestures. In some embodiments, a simple gesture consists of a single continuous contact on the touch-sensitive surface, such as a drag or swipe gesture. In some embodiments, a composite gesture includes a simple gesture and one or more additional gesture components (e.g., taps, swipes, additional contacts, etc.).

For example, as described above with reference to FIG. 5A, in navigation mode, simple gestures are directed to navigation, and more complex gestures (e.g., composite gestures) are directed to other operations or features, such as annotation. In annotation mode, simple gestures are directed to annotation, and more complex gestures are directed to other operations or features, such as navigation.

The device detects a first gesture on the touch-sensitive surface having a first gesture type (e.g., a swipe gesture) (610). For example, in FIG. 5A, gesture 506 is detected. As another example, in FIG. 5D, gesture 518, which is of the same type as gesture 506, is detected.

In response to detecting the first gesture (612), in accordance with a determination that the device is in the first operational mode, the device performs an operation having a first operation type (e.g., navigate) (614); and in accordance with a determination that the device is in the second operational mode, the device performs an operation having a second operation type distinct from the first operation type (e.g., highlight) (616). For example, in FIGS. 5A-5B, in response to detection of gesture 506 and a determination by device 100 that gesture 506 took place in navigation mode, device 100 navigates to a different page (e.g., by displaying a different page) in electronic document 501-1. In FIGS. 5D-5E, in response to detection of gesture 518 and a determination by device 100 that gesture 518 took place in annotation mode, text portion 508-2 in text 502-1 is highlighted with highlighting 514-2.

In some embodiments, the operation performed at the device in response to detecting the first gesture is determined based at least in part on a location and/or direction of the first gesture on the touch-sensitive surface (618). For example, if the operation performed at the device in response to detecting the first gesture is a highlighting operation, the highlighted portion of the document is a portion of the document proximate to a location on the display that corresponds to a location of the first gesture on the touch-sensitive surface. In contrast, if the operation performed at the device in response to detecting the first gesture is a navigation operation, the document advances to another portion in accordance with the direction of the first gesture (e.g., a swipe to the right may navigate to a previous page of the document while a swipe to the left navigates to a next page of the document). For example, in FIGS. 5A-5B, display of page 23 of electronic document 505-1 is replaced with display of page 22 in response to detection of gesture 506 moving in direction 507. In FIGS. 5D-5E, text portion 508-2 is highlighted with highlighting 514-2 in response to detection of gesture 518 going over the location corresponding to text portion 508-2.

The device detects a second gesture on the touch-sensitive surface having a second gesture type (e.g., a tap and swipe gesture) distinct from the first gesture type (620). For example, in FIG. 5B, gesture 510, which is a different type of gesture from gesture 506, is detected. As another example, in FIG. 5E, gesture 522, which is the same type as gesture 510 and a different type of gesture from gesture 518, is detected.

In response to detecting the second gesture (622), in accordance with a determination that the device is in the first operational mode, the device performs an operation having the second operation type (e.g., highlight) (624), and in accordance with a determination that the device is in the second operational mode, the device performs an operation having the first operation type (e.g., navigate) (626). For example, in FIGS. 5B-5C, in response to detection of gesture 510 and a determination by device 100 that gesture 510 took place in navigation mode, text portion 508-1 is highlighted with highlighting 514-1. In FIGS. 5E-5F, in response to detection of gesture 522 and a determination by device 100 that gesture 522 took place in annotation mode, device 100 navigates to a different page (e.g., by displaying a different page) in electronic document 501-1.

In some embodiments, the operation performed at the device in response to detecting the second gesture is determined based at least in part on a location and/or direction of the second gesture on the touch-sensitive surface (628). For example, if the operation performed at the device in response to detecting the second gesture is a highlighting operation, the highlighted portion of the document is a portion of the document proximate to a location on the display that corresponds to a location of the second gesture on the touch-sensitive surface. In contrast, if the operation performed at the device in response to detecting the second gesture is a navigation operation, the document advances to another portion in accordance with the direction of the second gesture (e.g., a swipe to the right may navigate to a previous page of the document while a swipe to the left navigates to a next page of the document). For example, in FIGS. 5B-5C, text portion 508-1 is highlighted with highlighting 514-1 in response to detection of gesture 510 going over the location corresponding to text portion 508-1. In FIGS. 5E-5F, display of page 23 of electronic document 505-1 is replaced with display of page 22 in response to detection of gesture 522 moving in direction 524.

In some embodiments, the display is displaying an electronic document (e.g., a webpage, word processing document, spreadsheet, desktop publishing document, slideshow document, drawing document, book, etc.), the first operation type is a navigation operation (e.g., advancing through pages of a document and/or scrolling through a document in one or two dimensions), and the second operation type is an annotation operation (e.g., highlighting text in the document or adding a note or other annotation to a portion of the document) (630). For example, in FIGS. 5A-5F, display 112 is displaying electronic document 501-1. The operation types applied in response to detected gestures include a navigation operation (e.g., navigating from page 23 to page 22 of electronic document 501-1) and an annotation operation (e.g., highlighting portions of text 502).

In some embodiments, the first gesture type is simpler to perform than the second gesture type (632). In some embodiments, the second gesture includes all of the components of the first gesture and additional components that occur prior to or after the components of the first gesture type. For example, gesture 506 may be a swipe gesture, and gesture 510 may be a tap gesture 510-1 plus a swipe gesture 510-2.

In some embodiments, the first gesture type is a swipe gesture and the second gesture type is a tap and swipe gesture (634). For example, gesture 506 may be a swipe gesture, and gesture 510 may be a tap and swipe gesture (tap gesture 510-1 plus swipe gesture 510-2). In some embodiments, the first gesture type is a tap and swipe gesture and the second gesture type is a double tap and swipe gesture (not shown).

In some embodiments, the first gesture type is single contact gesture and the second gesture type is a multi contact gesture. (e.g., the first gesture type is a single contact swipe, and the second gesture type is a single contact swipe while simultaneously detecting an additional "chording" contact) (636). For example, the first gesture type may be a swipe gesture, and the second gesture type may be a swipe gesture plus a simultaneous, distinct finger contact (e.g., using another finger digit on the hand not performing the swipe gesture) on the touch-sensitive surface. As an example, gesture 510 (FIG. 5C) may be, instead of a tap plus swipe gesture, a swipe gesture (e.g., gesture 510-2) plus a simultaneous, distinct finger contact.

In some embodiments, the device switches from the first operational mode to the second operational mode in response to detecting a predefined gesture (638). In some embodiments, the predefined gesture is a sequential multi-contact gesture (e.g., a "finger drumming gesture"), as described in greater detail below. In some embodiments, when the device detects the same predefined gesture while the device is already in the second operational mode, the device switches or toggles from the second operational mode to the first operational mode.

In some embodiments, the device switches from the first operational mode to the second operational mode in response to detecting a finger drumming gesture on the touch-sensitive surface (e.g., a sequential multi-contact gesture that is consistent with a person drumming their non-thumb fingers on the touch-sensitive surface) (640). For example, device 100, while displaying electronic document 501, may switch from annotation mode to navigation mode, and vice versa, in response to drumming gesture(s) 526 and/or 528 (depending on the embodiment, the predefined gesture is a drumming gesture using one hand or a gesture with both hands drumming substantially simultaneously). Gesture 526 includes contacts 526-A thru 526-D detected in sequence. Gesture 528 includes contacts 528-A thru 526-D detected in sequence.

In some embodiments, the finger drumming gesture is a two-handed finger drumming gesture (642). For example, the predefined finger drumming gesture may be gestures 526 (left hand) and 528 (right hand) performed substantially simultaneously (e.g., within 0.5 seconds of each other).

In some embodiments, the device includes a touch-sensitive surface that is distinct from the display and the touch sensitive surface is positioned on a side of the device (e.g., the back) that does not include the display (644). For example, as described above with reference to FIG. 5K, device 100 may have a touch-sensitive surface on a side opposite of display 112. Gestures (gestures 538, 540) may be performed on the backside touch-sensitive surface.

In some embodiments, the device displays a graphical user interface element in response to switching from the first operational mode to the second operational mode. In some embodiments, the graphical user interface element is a keyboard, a game controller, etc. For example, when device 100 switches from navigation mode to annotation mode, annotation toolbar 516 may be displayed.

In some embodiments, a method for navigating and annotating an electronic document is performed at an electronic device having a display and a touch-sensitive surface. The method includes, while the device is in a first operational mode (e.g., navigation mode): detecting a first gesture on the touch-sensitive surface having a first gesture type (e.g., tap and swipe), and in response to detecting the first gesture, performing a first operation having a first operation type (e.g., navigate); and detecting a second gesture on the touch-sensitive surface having a second gesture type (e.g., double tap and swipe) that is distinct from the first gesture type, and in response to detecting the second gesture, performing a second operation having a second operation type (e.g., highlight) that is distinct from the first operation type. The method also includes, while the device is in a second operational mode; detecting a third gesture on the touch-sensitive surface having the first gesture type (e.g., tap and swipe), and in response to detecting the third gesture, performing a third operation having the second operation type (e.g., highlight); and detecting the fourth gesture on the touch-sensitive surface having the second gesture type (e.g., double tap and swipe), and in response to detecting the fourth gesture, performing a fourth operation having the first operation type (e.g., navigate).

For example, in FIGS. 5A-5C, in response to detecting gesture 506 while in navigation mode, device 100 navigates to a different page (e.g., by displaying a different page) in electronic document 501-1; and in response to detecting gesture 510 while in navigation mode, text portion 508-1 is highlighted with highlighting 514-1. In FIGS. 5D-5F, in response to detecting gesture 518 while in annotation mode, text portion 508-2 in text 502-1 is highlighted with highlighting 514-2; and in response to detecting gesture 522 while in annotation mode, device 100 navigates to a different page (e.g., by displaying a different page) in electronic document 501-1.

Figure 7:
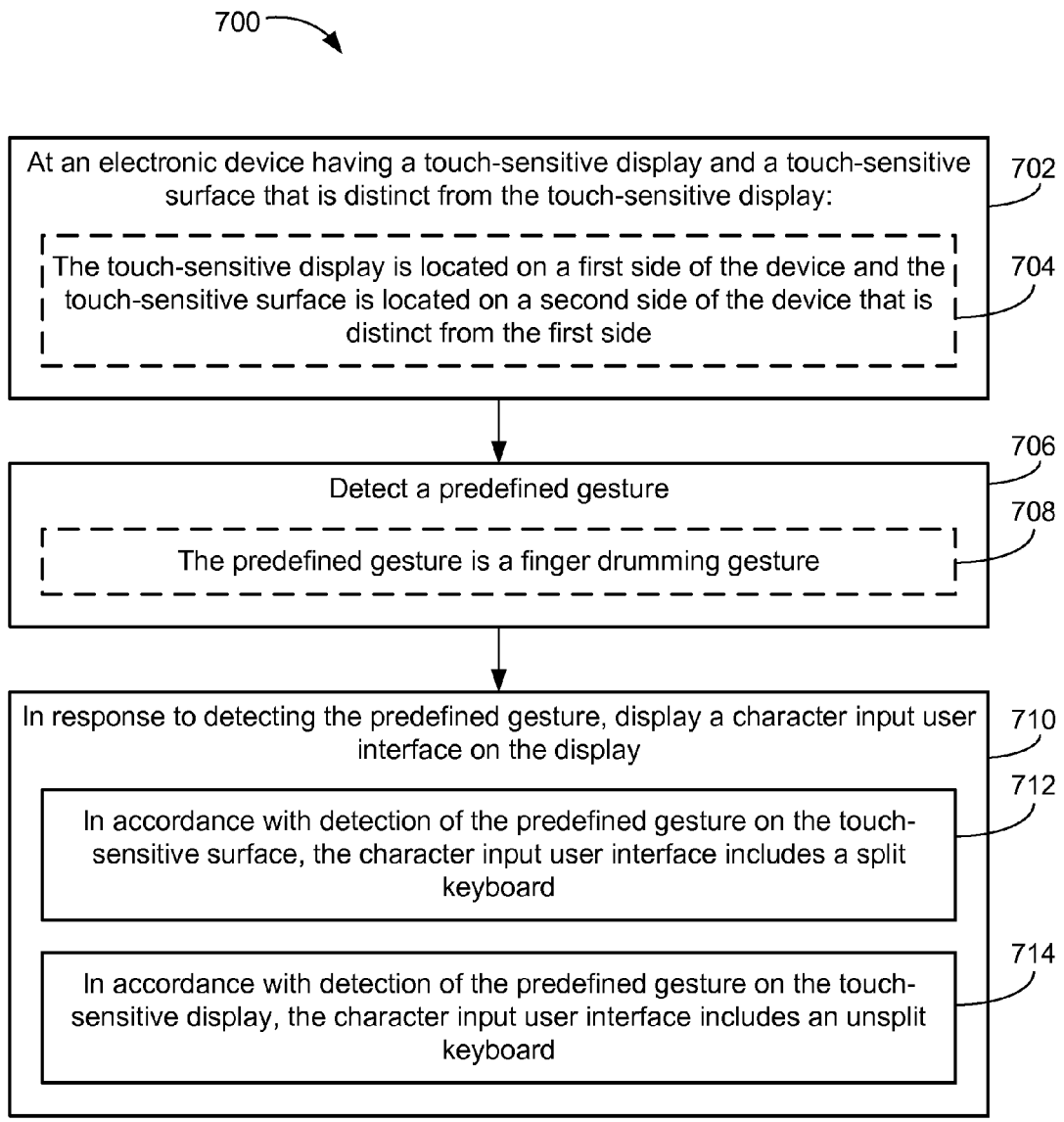
FIG. 7 is a flow diagram illustrating a method of displaying a split keyboard or an unsplit keyboard in accordance with some embodiments.

FIG. 7 is a flow diagram illustrating a method 700 of displaying a split keyboard or an unsplit keyboard in accordance with some embodiments. The method 700 is performed at an electronic device (e.g., device 300, FIG. 3, or portable multifunction device 100, FIG. 1) with a touch-sensitive display and a touch-sensitive surface that is distinct from the touch-sensitive display. Some operations in method 700 may be combined and/or the order of some operations may be changed.

As described below, the method 700 provides an intuitive way to display a split keyboard or an unsplit keyboard. The method displays a keyboard best suited to the user's likely hand position, thereby creating a more efficient text entry experience. For battery-operated electronic devices, enabling a user to display the proper keyboard faster and more efficiently conserves power and increases the time between battery charges.

The method is performed at an electronic device having a touch-sensitive display and a touch-sensitive surface that is distinct from the touch-sensitive display (702). In some embodiments, the touch-sensitive display is located on a first side (e.g., the front side of a tablet computer or the top inner side of clamshell/notebook computer) of the device and the touch-sensitive surface is located on a second side (e.g., the back side of a tablet computer or the bottom inner side of a clamshell/notebook computer) of the device that is distinct from the first side (704). For example, device 100 as illustrated in FIGS. 5I-5L has touch-sensitive display 112 and a touch-sensitive surface distinct from touch-sensitive display 112. As described with reference to FIG. 5K, the touch-sensitive surface may be on a side distinct from the side with touch-sensitive display 112.

The device detects a predefined gesture (706). In some embodiments, the predefined gesture is a finger drumming gesture (e.g., a sequential multi-contact gesture that is consistent with a person drumming their fingers on the touch-sensitive surface) (708). For example, in FIGS. 5I and 5K, drumming gestures 530/532 and 538/540 are detected on touch-sensitive display 112 and the distinct touch-sensitive surface, respectively.

In response to detecting the predefined gesture, the device displays a character input user interface on the display (710). The character input user interface includes a soft keyboard which is split or unsplit, depending on where the predefined gesture is detected.

In accordance with detection of the predefined gesture on the touch-sensitive surface, the character input user interface includes a split keyboard (e.g., as part of an integrated input area) (712). In some embodiments, a split keyboard includes a right side having a first plurality of character keys and a left side having a second plurality of character keys. In some embodiments, the first plurality includes one or more character keys that are not included in the second plurality. In some embodiments, the second plurality includes one or more character keys that are not included in the first plurality. In some embodiments, the first plurality is distinct from the second plurality. For example, in response to detection of gestures 538/540 and a determination that gestures 538/540 are detected on the distinct touch-sensitive surface, integrated input area 541 with split soft keyboard 542 is displayed on display 112.

In accordance with detection of the predefined gesture on the touch-sensitive display, the character input user interface includes an unsplit keyboard. (e.g., a single, unitary or merged keyboard that includes character keys from the left and right sides of the split keyboard) (714). For example, in response to detection of gestures 530/532 and a determination that gestures 530/532 are detected on touch-sensitive display 112, unsplit soft keyboard 534 is displayed on display 112.

By displaying a split or unsplit keyboard depending on which touch-sensitive surface the gesture is performed, the device displays a keyboard best suited to how the user is holding the device at that moment (with the gesture on the display corresponding to the device placed on a surface, and thus suited for touch typing with the unsplit keyboard; and the gesture on the touch-sensitive surface corresponding to the user holding the device with one or both hands, and thus suited for two-thumb typing with a split keyboard.

Figure 8A:
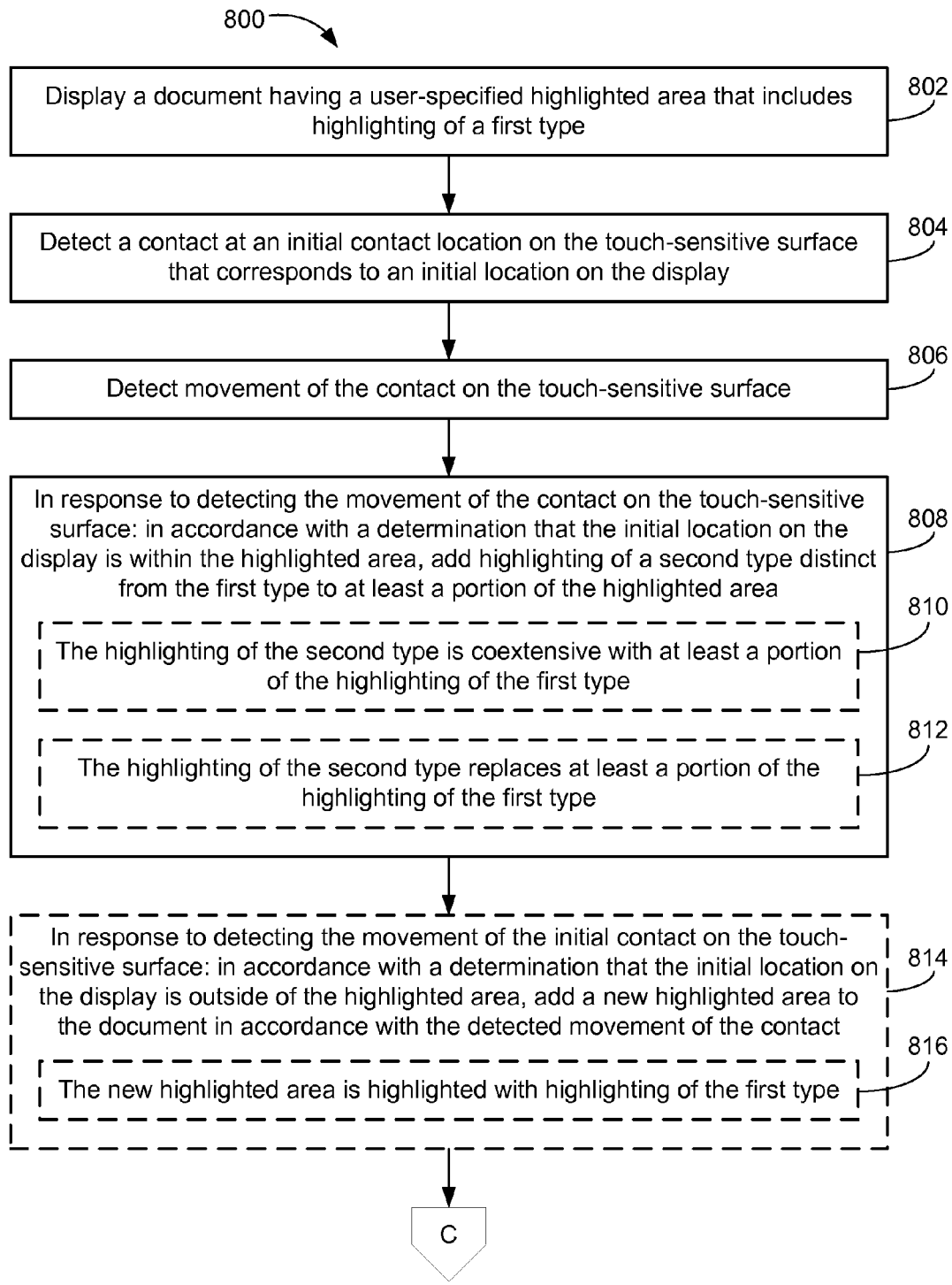
FIGS. 8A-8B are flow diagrams illustrating a method of annotating an electronic document in accordance with some embodiments.
Figure 8B:
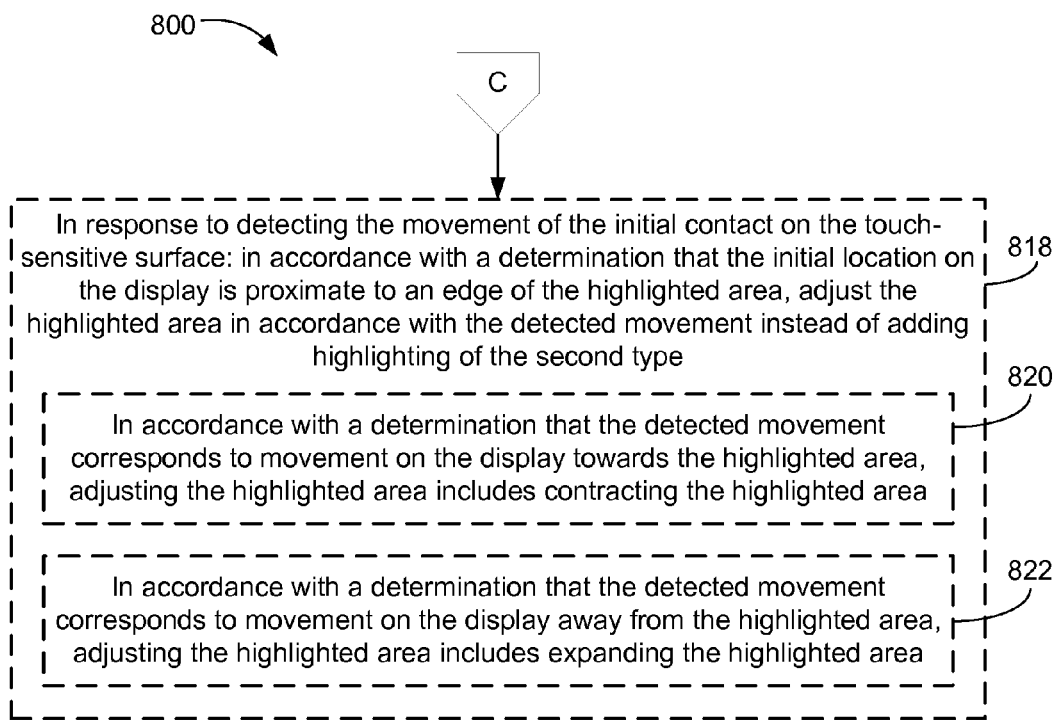

FIGS. 8A-8B are flow diagrams illustrating a method 800 of annotating an electronic document in accordance with some embodiments. The method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to add a second type of highlighting to part of an area that is already highlighted. The method reduces the cognitive burden on a user when adding a second type of highlighting, as the complexity of the procedure to add the second type of highlighting is reduced. For battery-operated electronic devices, enabling a user to annotate an electronic document faster and more efficiently conserves power and increases the time between battery charges.

The device displays a document having a user-specified highlighted area that includes highlighting of a first type (802). For example, in FIG. 5M, user-specified highlighting 544 is displayed on display 112. Highlighting 544 is of a first type (e.g., highlighting of a particular color).

The device detects a contact at an initial contact location on the touch-sensitive surface that corresponds to an initial location on the display (804). For example, in FIG. 5M, gesture 548 is detected on touch-sensitive display 112. Gesture 548 initiates from the finger contact at the location as illustrated in FIG. 5M.

The device detects movement of the contact on the touch-sensitive surface (806). For example, gesture 548 (FIG. 5M) includes movement 550, which is detected by device 100.

In response to detecting the movement of the contact on the touch-sensitive surface, in accordance with a determination that the initial location on the display is within the highlighted area, the device adds highlighting of a second type distinct from the first type to at least a portion of the highlighted area (e.g., in accordance with the movement of the contact) (808). For example, in response to detection of gesture 548 over text portion 546, text portion 546 is underlined with underlining 552, as illustrated in FIG. 5N. In some embodiments, the second type of highlighting is only added when the initial location on the display is more than a predefined distance from an edge of the highlighted area. In other words, other operations (e.g., extending or contracting the highlighting) may be performed if the initial location on the display is less than a predefined distance from an edge of the highlighted area.

In some embodiments, the highlighting of the second type is coextensive with at least a portion of the highlighting of the first type (810). For example, if a particular paragraph of text is already highlighted with yellow highlighting (e.g., highlighting 544, FIG. 5M), and the contact and subsequent movement cover a sentence within the paragraph (e.g., gesture 548 over text portion 546, FIG. 5M), the sentence is underlined so that the sentence is displayed with both yellow highlighting and underlining (e.g., text portion 546 with highlighting 544 and underlining 552, FIG. 5N).

In some embodiments, the highlighting of the second type replaces at least a portion of the highlighting of the first type (812). For example, if a particular paragraph of text is already highlighted with yellow highlighting (e.g., highlighting 544, FIG. 5M), and the contact and subsequent movement correspond to a sentence within the paragraph (e.g., gesture 548 over text portion 546, FIG. 5M), the sentence is highlighted with green highlighting instead of the yellow highlighting, so that the sentence is displayed with green highlighting while the rest of the paragraph is still displayed with yellow highlighting (e.g., the portion of highlighting 544 over text portion 546 is replaced by highlighting of a different color, not shown).

In some embodiments, in response to detecting the movement of the initial contact on the touch-sensitive surface, in accordance with a determination that the initial location on the display is outside of the highlighted area, the device adds a new highlighted area to the document in accordance with the detected movement of the contact (814). In other words, when the predefined gesture is detected within a highlighted area, the device adds a second level of highlighting to at least a portion of the highlighted area, and in contrast, when the predefined gesture is detected outside of the highlighted area, the device adds highlighting to a portion of the document that is outside of the highlighted area. For example, gesture 562 (FIG. 5P) is detected outside of highlighted area 544 and over text portion 566 not within the highlighted portion of text 543. In response to detection of gesture 562, text portion 566 is highlighted with highlighting 568 (FIG. 5Q).

In some embodiments, the new highlighted area is highlighted with the highlighting of the first type (816). In other words, in response to a particular type of gesture (e.g., tap and swipe), if the particular type of gesture is detected in an area that is already highlighted with a first type of highlighting, a second type of highlighting is added to at least a portion of the highlighted area. In contrast, if the particular type of gesture is detected in a respective area that is not already highlighted, the first type of highlighting is added to the respective area. For example, highlighting 568 and highlighting 544 (FIG. 5Q) are both of the same type (e.g., both are yellow in color).

In some embodiments, in response to detecting the movement of the initial contact on the touch-sensitive surface, in accordance with a determination that the initial location on the display is proximate to (e.g., within 10 pixels of or within 1 centimeters of) an edge of the highlighted area, the device adjusts the highlighted area in accordance with the detected movement instead of adding highlighting of the second type (818). In some embodiments, the highlighted area is only adjusted when the initial location on the display is outside of the highlighted area. In some embodiments, the highlighted area is adjusted without regard to whether or not the initial location on the display is within the highlighted area or outside of the highlighted area, so long as the initial location is proximate to the edge of the highlighted area. For example, gestures 554 and 558 are detected by device 100 in proximity of an edge of highlighting 544, as shown in FIGS. 5N and 5O, respectively. In response to detection of gestures 554 and 558, highlighting 554 is contracted and expanded, respectively, as shown in FIGS. 5O and 5P, respectively, without adding highlighting of the second type.

In some embodiments, in accordance with a determination that the detected movement corresponds to movement on the display towards the highlighted area, adjusting the highlighted area includes contracting the highlighted area (820). For example, gesture 554 (FIG. 5N) includes movement 556 toward highlighting 544. In response to detection of gesture 554 and a determination that movement 556 is toward highlighting 544 (based on the gesture detection), highlighting 554 is contracted, as shown in FIG. 5O.

In some embodiments, in accordance with a determination that the detected movement corresponds to movement on the display away from the highlighted area, adjusting the highlighted area includes expanding the highlighted area (822). For example, gesture 558 (FIG. 5O) includes movement 560 away from highlighting 544. In response to detection of gesture 558 and a determination that movement 560 is away from highlighting 544 (based on the gesture detection), highlighting 554 is expanded, as shown in FIG. 5P.

Figure 9:
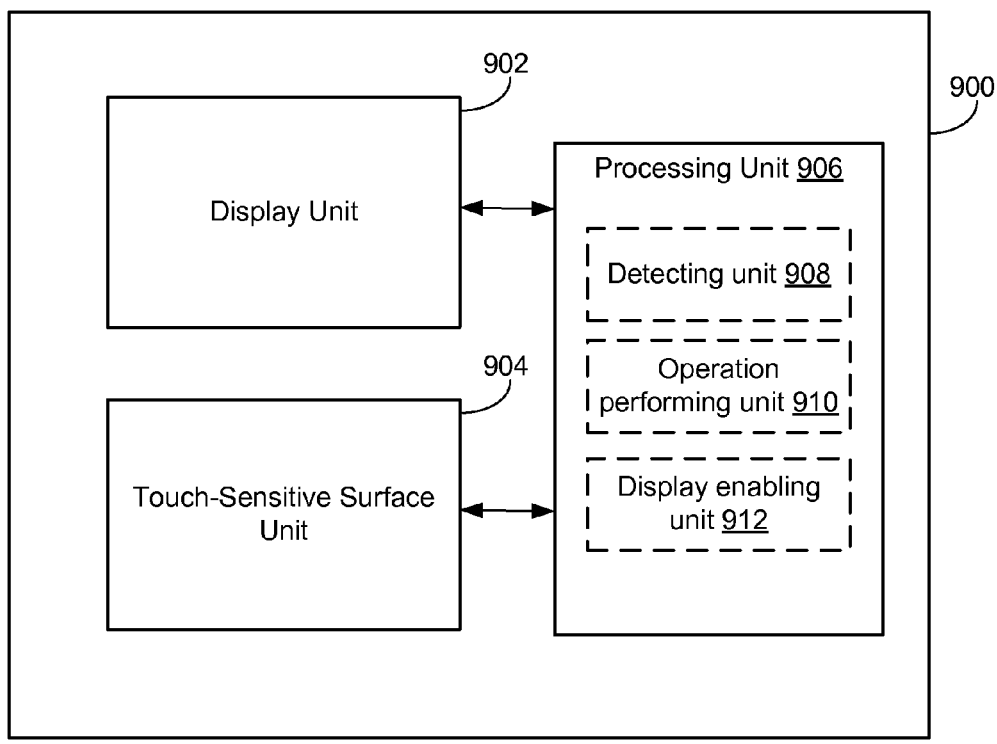
FIG. 9 is a functional block diagram of an electronic device in accordance with some embodiments.

In accordance with some embodiments, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, an electronic device 900, configured to operate in a first operational mode at some times and in a second operational mode distinct from the first operational mode at other times, includes a display unit 902; a touch-sensitive surface unit 904 configured to receive user gestures; and a processing unit 906 coupled to the display unit 902 and the touch-sensitive surface unit 904. In some embodiments, the processing unit 906 includes a detecting unit 908, an operation performing unit 910, and a display enabling unit 912. The processing unit 906 is configured to detect a first gesture on the touch-sensitive surface unit 904 having a first gesture type (e.g., with the detecting unit 908), and in response to detecting the first gesture: in accordance with a determination that the electronic device 900 is in the first operational mode, perform an operation having a first operation type (e.g., with the operation performing unit 910); and in accordance with a determination that the electronic device 900 is in the second operational mode, perform an operation having a second operation type distinct from the first operation type (e.g., with the operation performing unit 910). The processing unit 906 is also configured to detect a second gesture on the touch-sensitive surface unit 904 having a second gesture type distinct from the first gesture type (e.g., with the detecting unit 908); and in response to detecting the second gesture: in accordance with a determination that the electronic device 900 is in the first operational mode, perform an operation having the second operation type (e.g., with the operation performing unit 910); and in accordance with a determination that the electronic device 900 is in the second operational mode, perform an operation having the first operation type (e.g., with the operation performing unit 910).

In some embodiments, the first operational mode is a navigation-preferred mode; and the second operational mode is an annotation-preferred mode.

In some embodiments, while the electronic device is in a navigation-preferred mode: a plurality of simple gestures are associated with corresponding basic navigation operations; and a plurality of composite gestures are associated with corresponding basic annotation operations, where a composite gesture has multiple components including a single continuous contact on the touch-sensitive surface unit and at least one other component.

In some embodiments, while the electronic device is in an annotation-preferred mode: a plurality of simple gestures are associated with corresponding basic annotation operations; and a plurality of composite gestures are associated with corresponding basic navigation operations, where a composite gesture has multiple components including a single continuous contact on the touch-sensitive surface unit and at least one other component.

In some embodiments, the display unit 902 is displaying an electronic document, the first operation type is a navigation operation, and the second operation type is an annotation operation.

In some embodiments, the first gesture type is simpler to perform than the second gesture type.

In some embodiments, the first gesture type is a swipe gesture and the second gesture type is a tap and swipe gesture.

In some embodiments, the first gesture type is single contact gesture and the second gesture type is a multi-contact gesture.

In some embodiments, the operation performed at the electronic device 900 in response to detecting the first gesture is determined based at least in part on a location and/or direction of the first gesture on the touch-sensitive surface unit 904.

In some embodiments, the operation performed at the electronic device 900 in response to detecting the second gesture is determined based at least in part on a location and/or direction of the second gesture on the touch-sensitive surface unit 904.

In some embodiments, the electronic device 900 switches from the first operational mode to the second operational mode in response to detecting a predefined gesture.

In some embodiments, the electronic device 900 switches from the first operational mode to the second operational mode in response to detecting a finger drumming gesture on the touch-sensitive surface unit 904.

In some embodiments, the finger drumming gesture is a two-handed finger drumming gesture.

In some embodiments, the display unit 902 is distinct from the touch-sensitive surface unit 904 and the touch sensitive surface unit 904 is positioned on a side of the electronic device 900 that does not include the display unit 902.

In some embodiments, the processing unit 906 is configured to enable display of a graphical user interface element in response to switching from the first operational mode to the second operational mode (e.g., with a display enabling unit 912).

Figure 10:
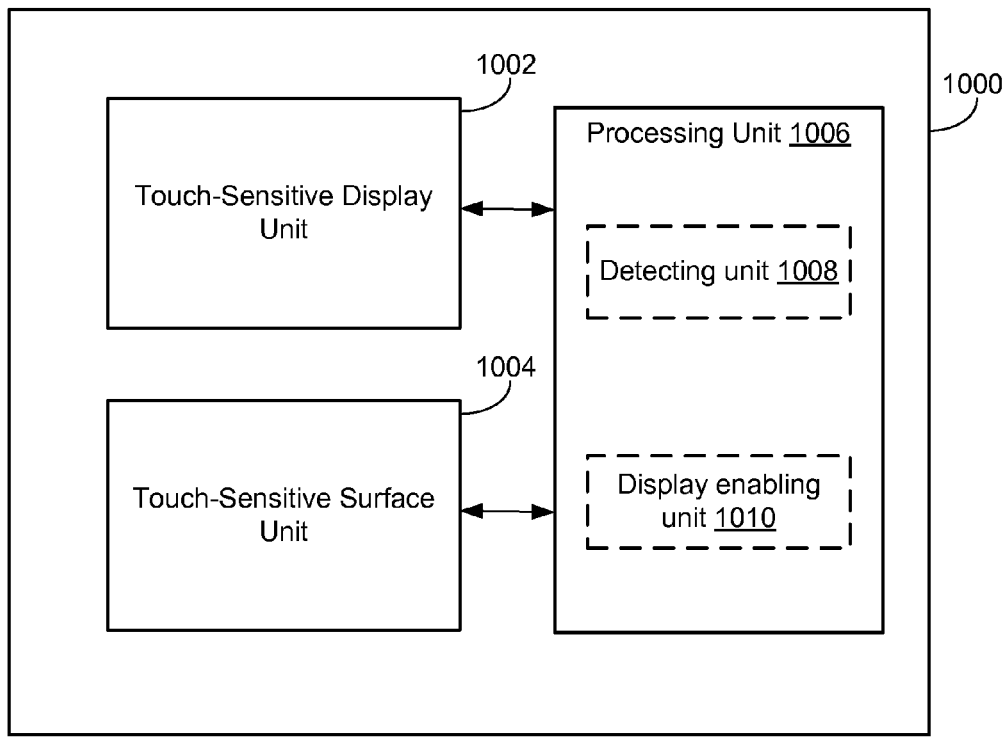
FIG. 10 is a functional block diagram of an electronic device in accordance with some embodiments.

In accordance with some embodiments, FIG. 10 shows a functional block diagram of an electronic device 1000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 10 may be combined or separated into sub-blocks to implement the principles of the invention as described above. Therefore, the description herein may support any possible combination or separation or further definition of the functional blocks described herein.

As shown in FIG. 10, an electronic device 1000 includes a touch-sensitive display unit 1002 configured to receive user gestures; a touch-sensitive surface unit 1004, distinct from the touch-sensitive display unit 1002, configured to receive user gestures; and a processing unit 1006 coupled to the touch-sensitive display unit 1002, and the touch-sensitive surface unit 1004. In some embodiments, the processing unit 1006 includes a detecting unit 1008 and a display enabling unit 1010. The processing unit 1006 is configured to detect a predefined gesture (e.g., with the detecting unit 1008), and in response to detecting the predefined gesture, enable display (e.g., with the display enabling unit 1010) of a character input user interface on the touch-sensitive display unit 1002. In accordance with detection of the predefined gesture on the touch-sensitive surface unit 1004, the character input user interface includes a split keyboard. In accordance with detection of the predefined gesture on the touch-sensitive display unit 1002, the character input user interface includes an unsplit keyboard.

In some embodiments, the predefined gesture is a finger drumming gesture.

In some embodiments, the touch-sensitive display unit 1002 is located on a first side of the electronic device 1000 and the touch-sensitive surface unit 1004 is located on a second side of the electronic device 1000 that is distinct from the first side.

Figure 11:
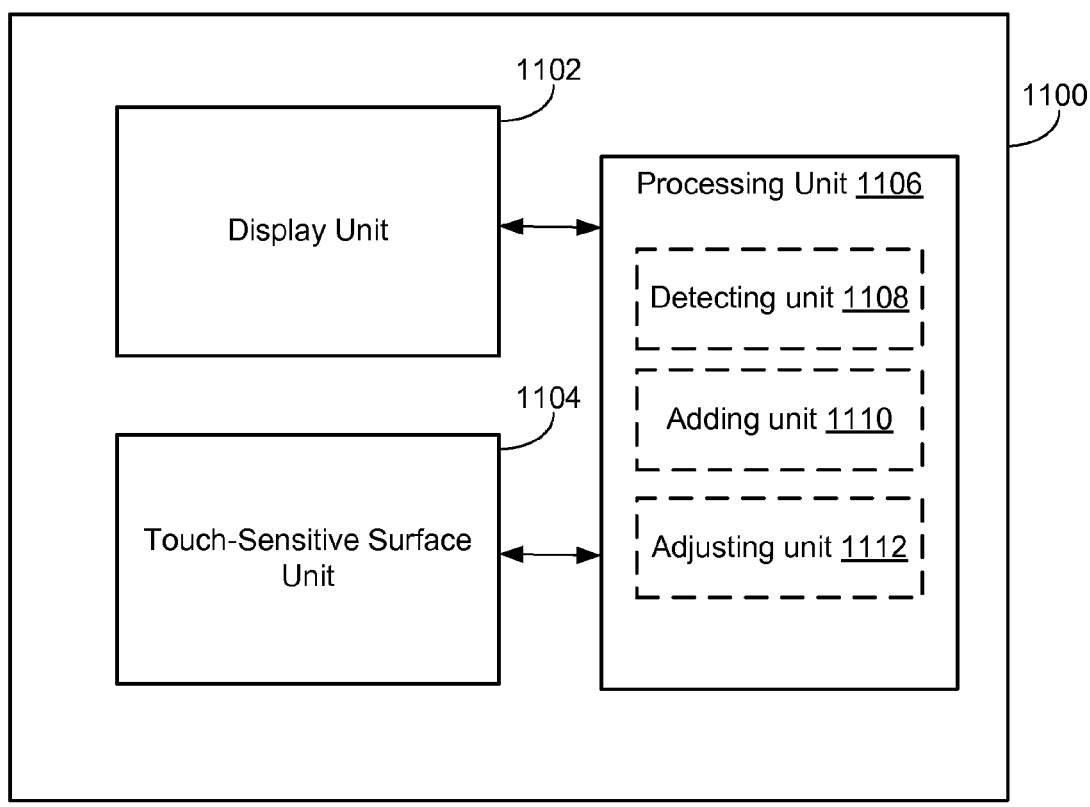
FIG. 11 is a functional block diagram of an electronic device in accordance with some embodiments.

In accordance with some embodiments, FIG. 11 shows a functional block diagram of an electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, an electronic device 1100 includes a display unit 1102 configured to display a document having a user-specified highlighted area that includes highlighting of a first type; a touch-sensitive surface unit 1104 configured to receive user gestures; and a processing unit 1106 coupled to the display unit 1102 and the touch-sensitive surface unit 1104. In some embodiments, the processing unit 1106 includes a detecting unit 1108, adding unit 1110, and adjusting unit 1112. The processing unit 1106 is configured to detect a contact at an initial contact location on the touch-sensitive surface unit 1104 that corresponds to an initial location on the display unit 1102 (e.g., with the detecting unit 1108), detect movement of the contact on the touch-sensitive surface unit 1104 (e.g., with the detecting unit 1108), and, in response to detecting the movement of the contact on the touch-sensitive surface unit 1104, in accordance with a determination that the initial location on the display unit 1102 is within the highlighted area, add highlighting of a second type distinct from the first type to at least a portion of the highlighted area (e.g., with the adding unit 1110).

In some embodiments, the highlighting of the second type is coextensive with at least a portion of the highlighting of the first type.

In some embodiments, the highlighting of the second type replaces at least a portion of the highlighting of the first type.

In some embodiments, the processing unit 1106 is configured to, in response to detecting the movement of the initial contact on the touch-sensitive surface unit 1104, in accordance with a determination that the initial location on the display unit 1102 is outside of the highlighted area, add a new highlighted area to the document in accordance with the detected movement of the contact (e.g., with the adding unit 1110).

In some embodiments, the new highlighted area is highlighted with the first type.

In some embodiments, the processing unit 1106 is configured to, in response to detecting the movement of the initial contact on the touch-sensitive surface unit 1104, in accordance with a determination that the initial location on the display unit 1102 is proximate to an edge of the highlighted area, adjust the highlighted area in accordance with the detected movement instead of adding highlighting of the second type (e.g., with the adjusting unit 1112).

In some embodiments, in accordance with a determination that the detected movement corresponds to movement on the display unit 1102 towards the highlighted area, adjusting the highlighted area includes contracting the highlighted area; and in accordance with a determination that the detected movement corresponds to movement on the display unit 1102 away from the highlighted area, adjusting the highlighted area includes expanding the highlighted area.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6C, 7, 8A-8B may be implemented by components depicted in FIGS. 1A-1B. For example, detecting operations 610 and 620; performing operations 614, 616, 624, and 626, detecting operation 706, displaying operation 710, detecting operations 804 and 806, and adding operation 808 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, configured to operate in a navigation-preferred mode at some times and in an annotation-preferred mode distinct from the navigation-preferred mode at other times, comprising:
 a display and a touch-sensitive surface;
 one or more processors;
 memory; and
 one or more programs, wherein the one or more programs are stored in the memory and configured to be executed by the one or more processors, the one or more programs including instructions for:
 displaying an electronic book on the display;
 detecting a first gesture on the touch-sensitive surface having a first gesture type; and
 in response to detecting the first gesture:
 in accordance with a determination that the device is in the navigation-preferred mode, performing a navigation operation on the electronic book; and
 in accordance with a determination that the device is in the annotation-preferred mode, performing a text annotation operation on the electronic book distinct from the navigation operation on the electronic book;
 detecting a second gesture on the touch-sensitive surface having a second gesture type distinct from the first gesture type; and
 in response to detecting the second gesture:
 in accordance with a determination that the device is in the navigation-preferred mode, performing a text annotation operation on the electronic book; and
 in accordance with a determination that the device is in the annotation-preferred mode, performing a navigation operation on the electronic book.

2. The device of claim 1, wherein, while the device is in a navigation-preferred mode:
 a plurality of simple gestures are associated with corresponding basic navigation operations; and
 a plurality of composite gestures are associated with corresponding basic annotation operations, wherein a composite gesture has multiple components including a single continuous contact on the touch-sensitive surface and at least one other component.

3. The device of claim 1, wherein, while the device is in an annotation-preferred mode:
 a plurality of simple gestures are associated with corresponding basic annotation operations; and
 a plurality of composite gestures are associated with corresponding basic navigation operations, wherein a composite gesture has multiple components including a single continuous contact on the touch-sensitive surface and at least one other component.

4. The device of claim 1, wherein the first gesture type is a swipe gesture and the second gesture type is a tap and swipe gesture.

5. The device of claim 1, wherein the first gesture type is single contact gesture and the second gesture type is a multi contact gesture.

6. The device of claim 1, wherein the device switches from the navigation-preferred mode to the annotation-preferred mode in response to detecting a finger drumming gesture on the touch-sensitive surface.

7. The device of claim 6, wherein the display is distinct from the touch-sensitive surface and the touch sensitive surface is positioned on a side of the device that does not include the display.

8. A method, comprising:
at an electronic device having a display and a touch-sensitive surface, the device configured to operate in a navigation-preferred mode at some times and in an annotation-preferred mode distinct from the navigation-preferred mode at other times:
displaying an electronic book on the display;
detecting a first gesture on the touch-sensitive surface having a first gesture type; and
in response to detecting the first gesture:
in accordance with a determination that the device is in the navigation-preferred mode, performing a navigation operation on the electronic book; and
in accordance with a determination that the device is in the annotation-preferred mode, performing a text annotation operation on the electronic book distinct from the navigation operation on the electronic book;
detecting a second gesture on the touch-sensitive surface having a second gesture type distinct from the first gesture type; and
in response to detecting the second gesture:
in accordance with a determination that the device is in the navigation-preferred mode, performing a text annotation operation on the electronic book; and
in accordance with a determination that the device is in the annotation-preferred mode, performing a navigation operation on the electronic book.

9. The method of claim 8, wherein, while the device is in a navigation-preferred mode:
a plurality of simple gestures are associated with corresponding basic navigation operations; and
a plurality of composite gestures are associated with corresponding basic annotation operations, wherein a composite gesture has multiple components including a single continuous contact on the touch-sensitive surface and at least one other component.

10. The method of claim 8, wherein, while the device is in an annotation-preferred mode:
a plurality of simple gestures are associated with corresponding basic annotation operations; and
a plurality of composite gestures are associated with corresponding basic navigation operations, wherein a composite gesture has multiple components including a single continuous contact on the touch-sensitive surface and at least one other component.

11. The method of claim 8, wherein the first gesture type is a swipe gesture and the second gesture type is a tap and swipe gesture.

12. The method of claim 8, wherein the first gesture type is single contact gesture and the second gesture type is a multi contact gesture.

13. The method of claim 8, wherein the device switches from the navigation-preferred mode to the annotation-preferred mode in response to detecting a finger drumming gesture on the touch-sensitive surface.

14. The method of claim 13, wherein the display is distinct from the touch-sensitive surface and the touch sensitive surface is positioned on a side of the device that does not include the display.

15. A non-transitory computer readable storage medium storing one or more programs, the one or more programs comprising instructions, which when executed by an electronic device with a display and a touch-sensitive surface, the device configured to operate in a navigation-preferred mode at some times and in an annotation-preferred mode distinct from the navigation-preferred mode at other times, cause the device to:
display an electronic book on the display;
detect a first gesture on the touch-sensitive surface having a first gesture type; and
in response to detecting the first gesture:
in accordance with a determination that the device is in the navigation-preferred mode, perform a navigation operation on the electronic book; and
in accordance with a determination that the device is in the annotation-preferred mode, perform a text annotation operation on the electronic book distinct from the navigation operation on the electronic book;
detect a second gesture on the touch-sensitive surface having a second gesture type distinct from the first gesture type; and
in response to detecting the second gesture:
in accordance with a determination that the device is in the navigation-preferred mode, perform a text annotation operation on the electronic book; and
in accordance with a determination that the device is in the annotation-preferred mode, perform a navigation operation on the electronic book.

16. The computer readable storage medium of claim 15, wherein, while the device is in a navigation-preferred mode:
a plurality of simple gestures are associated with corresponding basic navigation operations; and
a plurality of composite gestures are associated with corresponding basic annotation operations, wherein a composite gesture has multiple components including a single continuous contact on the touch-sensitive surface and at least one other component.

17. The computer readable storage medium of claim 15, wherein, while the device is in an annotation-preferred mode:
a plurality of simple gestures are associated with corresponding basic annotation operations; and
a plurality of composite gestures are associated with corresponding basic navigation operations, wherein a composite gesture has multiple components including a single continuous contact on the touch-sensitive surface and at least one other component.

18. The computer readable storage medium of claim 15, wherein the first gesture type is a swipe gesture and the second gesture type is a tap and swipe gesture.

19. The computer readable storage medium of claim 15, wherein the first gesture type is single contact gesture and the second gesture type is a multi contact gesture.

20. The computer readable storage medium of claim 15, wherein the device switches from the navigation-preferred mode to the annotation-preferred mode in response to detecting a finger drumming gesture on the touch-sensitive surface.

21. The computer readable storage medium of claim 20, wherein the display is distinct from the touch-sensitive surface and the touch sensitive surface is positioned on a side of the device that does not include the display.

* * * * *